United States Patent [19]

Matthews et al.

[11] 4,371,752

[45] Feb. 1, 1983

[54] ELECTRONIC AUDIO COMMUNICATION SYSTEM

[75] Inventors: Gordon H. Matthews, Plano; Thomas B. Tansil; Michael L. Fannin, both of Dallas, all of Tex.

[73] Assignee: ECS Telecommunications, Inc., Dallas, Tex.

[21] Appl. No.: 97,240

[22] Filed: Nov. 26, 1979

[51] Int. Cl.³ .............. H04M 1/66; H04M 3/42; H04M 15/04

[52] U.S. Cl. .............. 179/7.1 TP; 179/18 B; 179/18 DA

[58] Field of Search .............. 179/18 B, 18 BF, 5 P, 179/18 ES, 1 SM, 7.1 TP, 18 DA, 6.01, 6.02, 6.05, 6.2, 6.17; 360/32, 12; 370/61, 60, 94, 67, 85, 62, 86

[56] References Cited

U.S. PATENT DOCUMENTS

| | | | |
|---|---|---|---|
| 2,385,968 | 10/1945 | Deakin | 179/6 E |
| 2,868,880 | 1/1959 | Celetano | 179/6 |
| 2,998,489 | 8/1961 | Riesz | 179/6 C |
| 3,141,931 | 7/1964 | Zarouni | 179/6 E |
| 3,175,039 | 3/1965 | Wilbourn, Jr. | 179/7.1 TP |
| 3,190,961 | 6/1965 | Fitzpatrick et al. | 179/6 E |
| 3,226,478 | 12/1965 | Martin et al. | 179/6 C |
| 3,286,033 | 11/1966 | Lemelson | 179/6 E |
| 3,301,958 | 1/1967 | Blakeslee et al. | 179/6 D |
| 3,400,378 | 9/1968 | Smith et al. | 340/150 |
| 3,403,383 | 9/1968 | Kienzle et al. | 370/61 X |
| 3,445,601 | 5/1969 | Whitely et al. | 179/6 D |
| 3,461,241 | 8/1969 | Menke | 179/5 P |
| 3,510,598 | 5/1970 | Ballin et al. | 179/18 BE |
| 3,538,257 | 11/1970 | Wright, Jr. et al. | 179/5 P |
| 3,595,999 | 7/1971 | Cole | 179/6 D |
| 3,728,486 | 4/1973 | Kraus | 179/2 R |
| 3,780,227 | 12/1973 | Piernie, Jr. et al. | 179/6 C |
| 3,789,144 | 1/1974 | Doyle | 179/1 SM X |
| 3,894,188 | 7/1975 | Konno | 179/6 E |
| 3,934,095 | 1/1976 | Matthews et al. | 179/18 D |
| 3,987,247 | 10/1976 | Fizer | 179/18 B X |
| 3,995,121 | 11/1976 | Alvis | 179/6 E X |
| 4,002,842 | 1/1977 | Meyr et al. | 370/86 |
| 4,054,756 | 10/1977 | Comella et al. | 179/18 B |
| 4,072,825 | 2/1978 | McLay et al. | 179/18 B |
| 4,138,597 | 2/1979 | Ashford | 370/67 |
| 4,144,582 | 3/1979 | Hyatt | 364/900 |
| 4,160,125 | 7/1979 | Bower et al. | 179/6 D |
| 4,188,507 | 2/1980 | Meri et al. | 179/6 D |
| 4,229,624 | 10/1980 | Haben et al. | 179/18 E |

FOREIGN PATENT DOCUMENTS

| | | | |
|---|---|---|---|
| 2412382 | 9/1975 | Fed. Rep. of Germany | 129/1 SM |
| 507954 | 4/1976 | U.S.S.R. | 179/6 D |

OTHER PUBLICATIONS

"Unified Communications System Serves Five Hospitals at Detroit Medical Center", Carl O. Haven, *Communications News*, Jan. 1976, pp. 49-51.

"IBM Voice Storage Network Described", R. A. Frank, *Communications Weekly*, 1978.

"New Custom Calling Services", Bergland et al., International Switching Symposium, Paris, May 11, 1979, pp. 1-7.

"New Custom Calling Services", Nacon and Worrall, International Conference on Communications, Boston, Mass., Jun. 1979, pp. 1-5.

"Prospectives in Voice Response from Computers", Wm. D. Chapman, *Proceedings of International Conference on Communications*, San Francisco, Jun. 1970, pp. 45-1 to 45-8.

"DMS-10 System Organization", Rushing & Totti, *Telesos* (Canada), Aug. 1978, pp. 303-308.

*Primary Examiner*—Thomas W. Brown
*Attorney, Agent, or Firm*—Richards, Harris & Medlock

[57] ABSTRACT

An advanced electronic telecommunication system is provided for the deposit, storage and delivery of audio messages. A Voice Message System (10) interconnects multiple private branch exchanges (12) of a subscriber with a central telephone office (22). Individual subscriber users may access the Voice Message System (10) through ON NET telephones (18) or OFF NET telephones (24). The Voice Message System (10) includes an administrative subsystem (60), call processor subsystem (62) and a data storage subsystem (64). The Voice Message System (10) enables the user to deposit a message in data storage subsystem (64) for automatic delivery to other addressees connected to the system. The Voice Message System (10) also enables a user to access the system to determine if any messages have been in the data storage subsystem (64) for him. Pre-recorded instructional messages are deposited in the data storage subsystem (64) for instructing a user on his progress in using the system. A Universal Control Board is a programmable electronic digital signal processing means for controlling certain functions of the administrative subsystem (60), call processor subsystem (62) and data storage subsystem (64).

51 Claims, 36 Drawing Figures

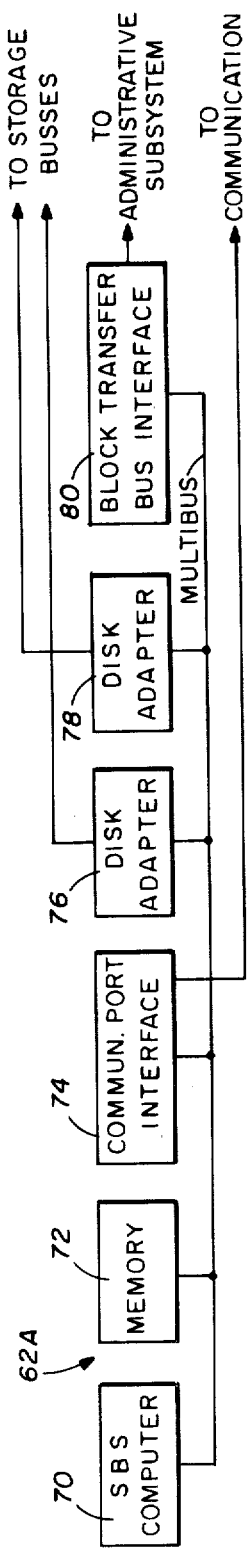
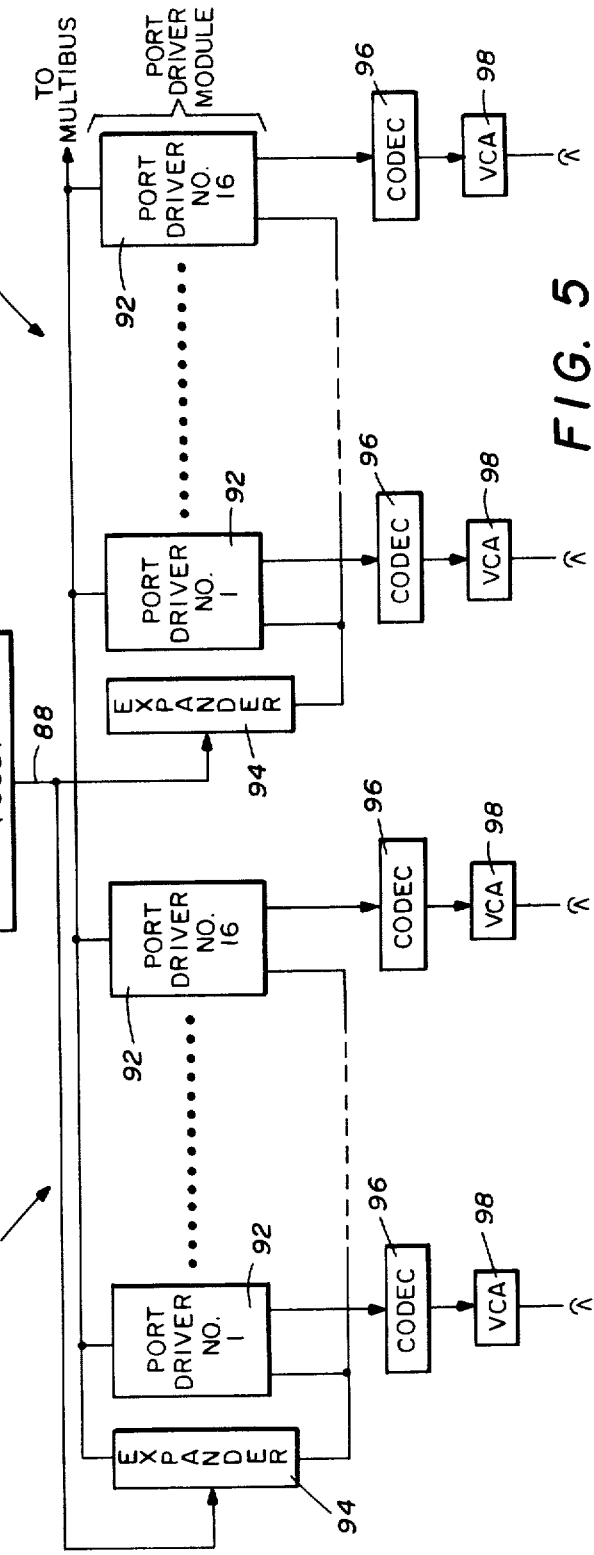
FIG. 4
FIG. 5

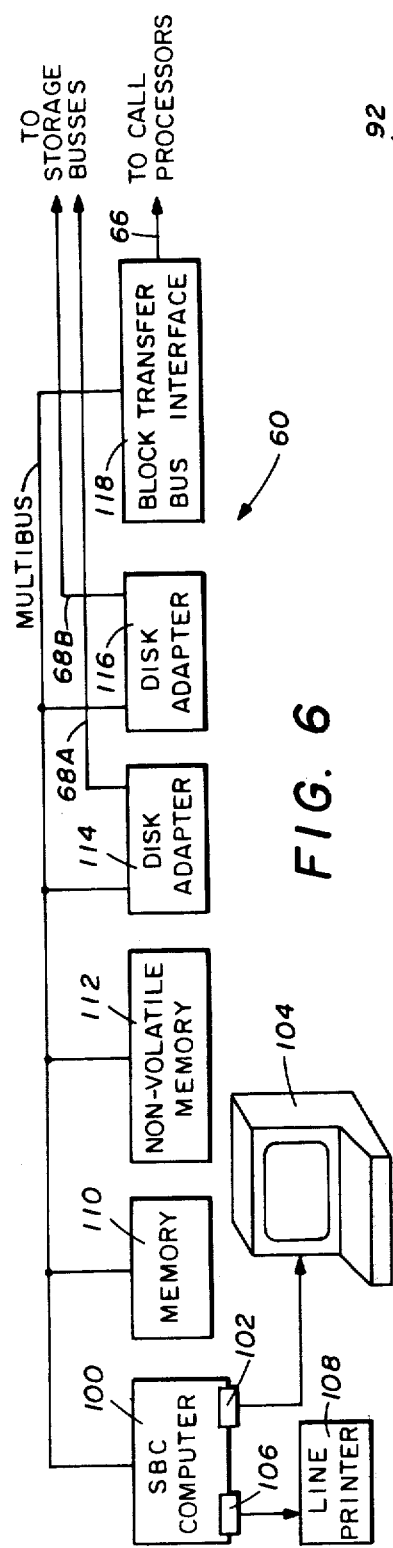
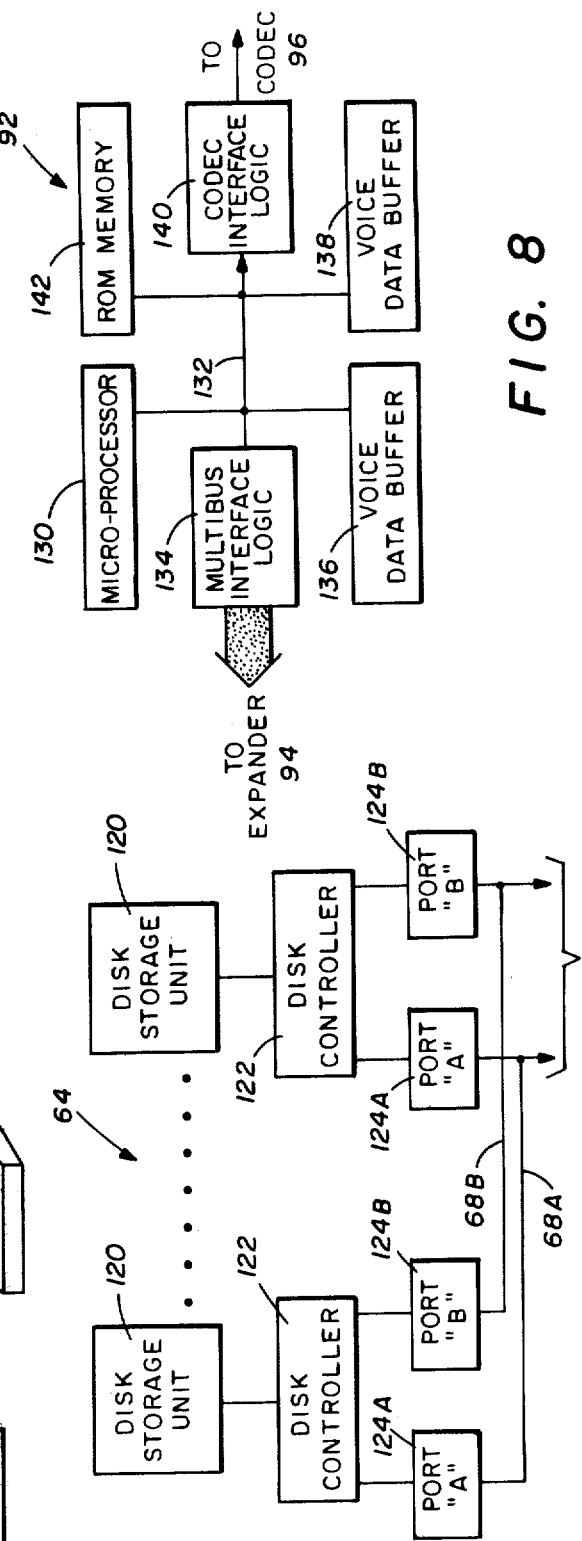
FIG. 6
FIG. 7
FIG. 8

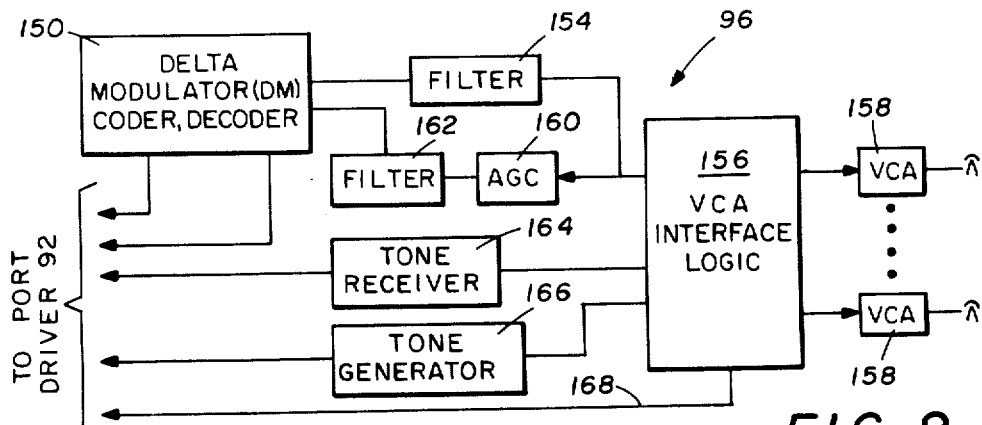
FIG. 9
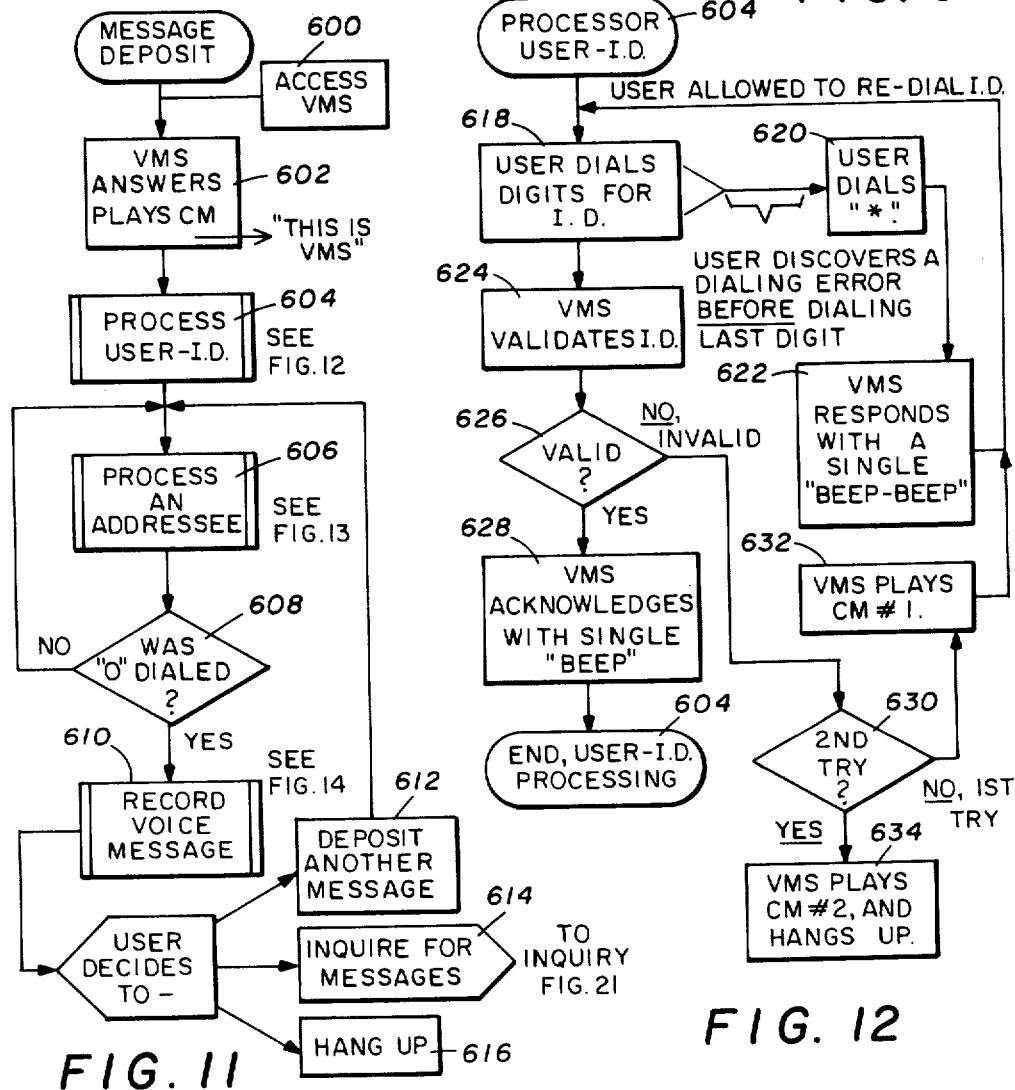
FIG. 11
FIG. 12

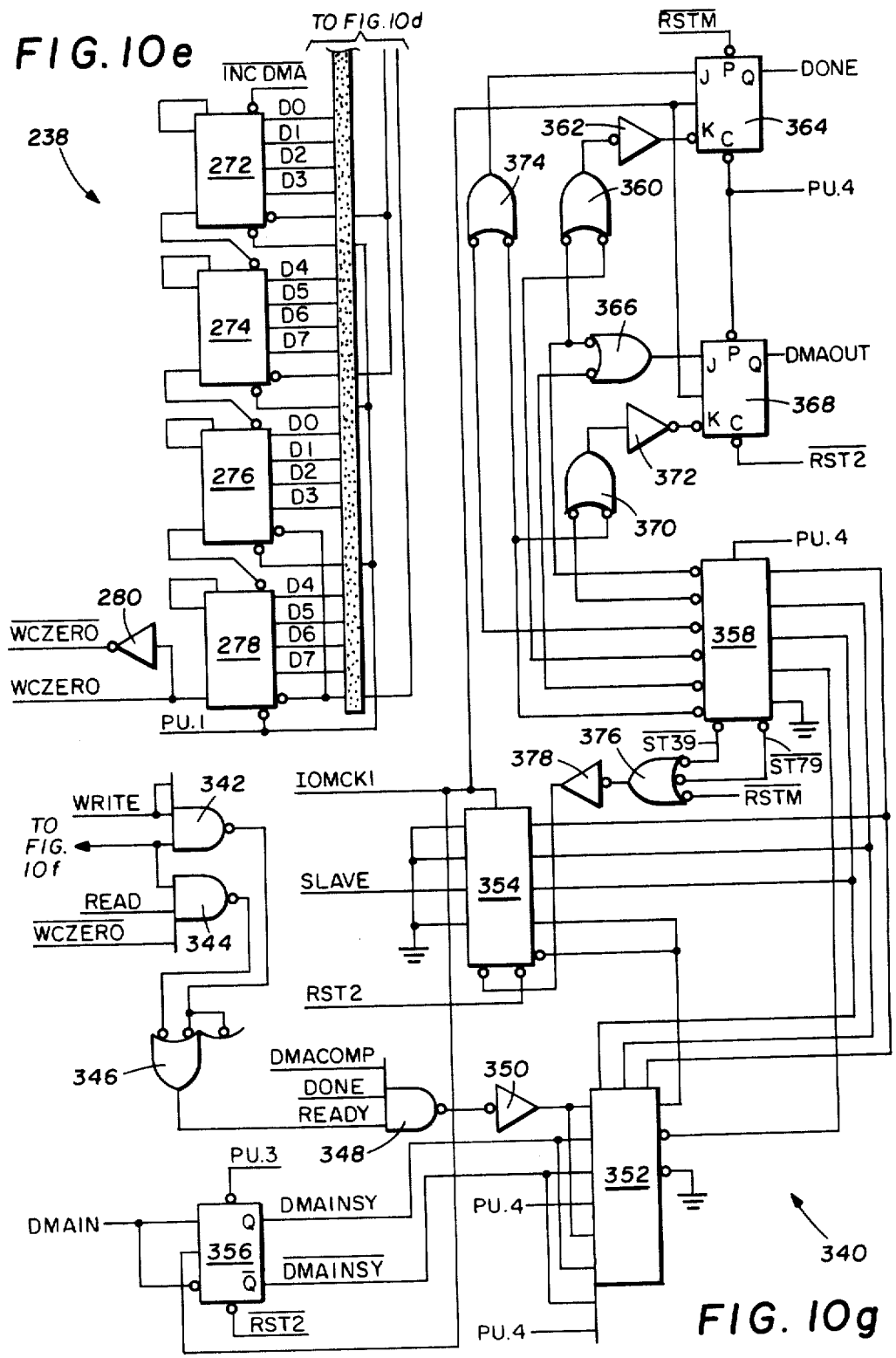

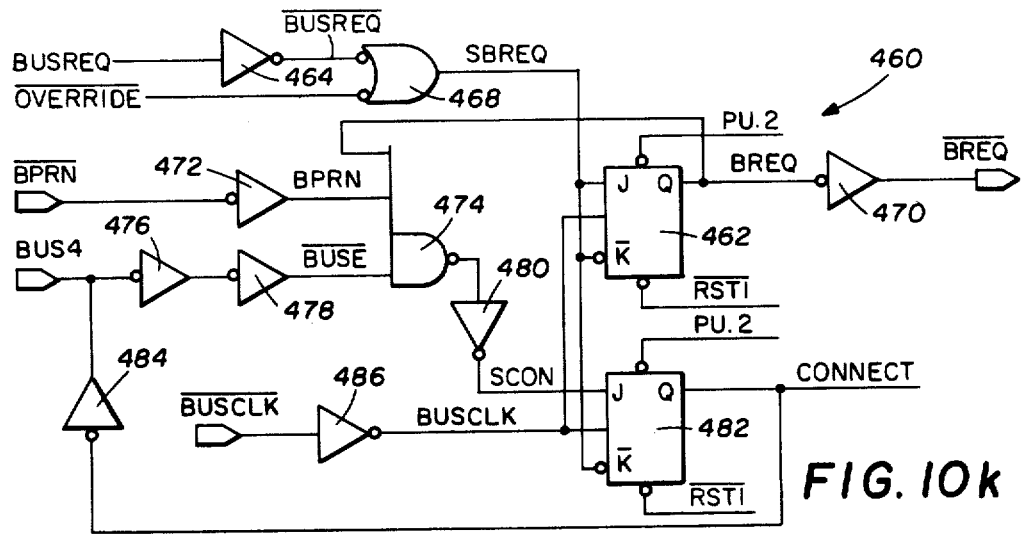
FIG. 10k
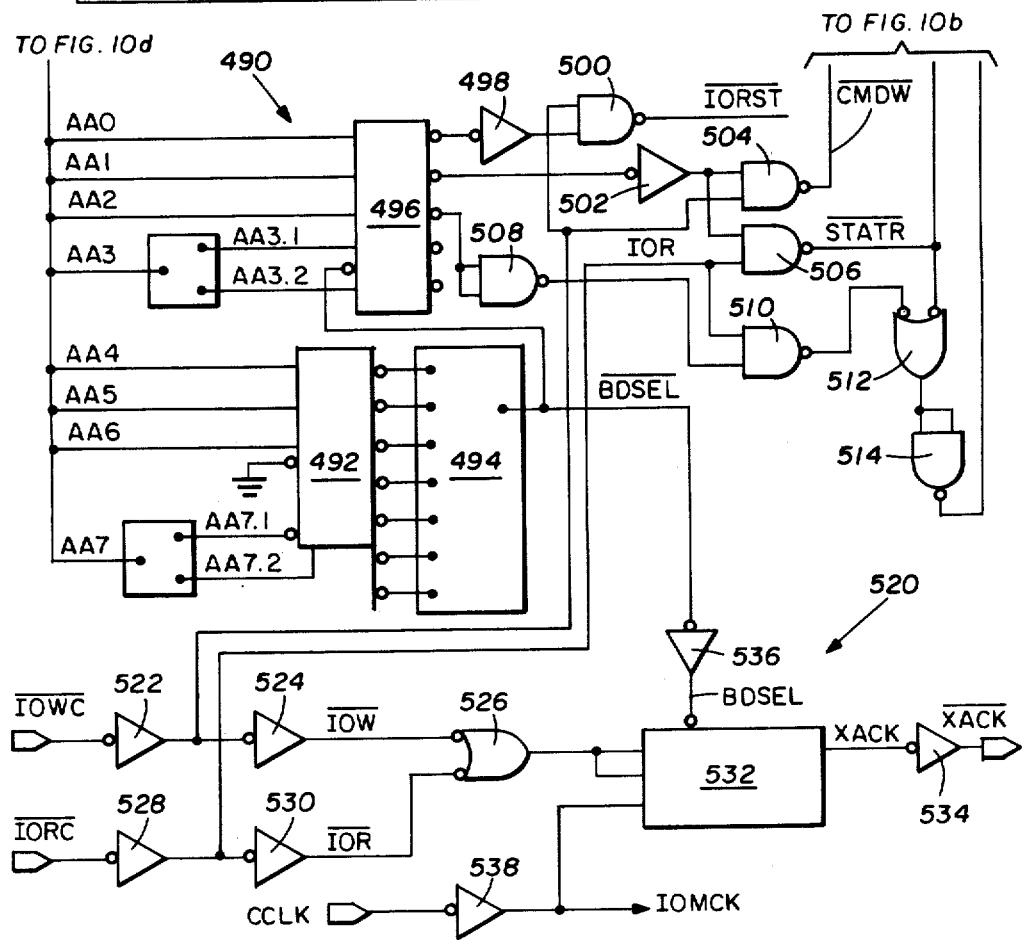
FIG. 10ℓ

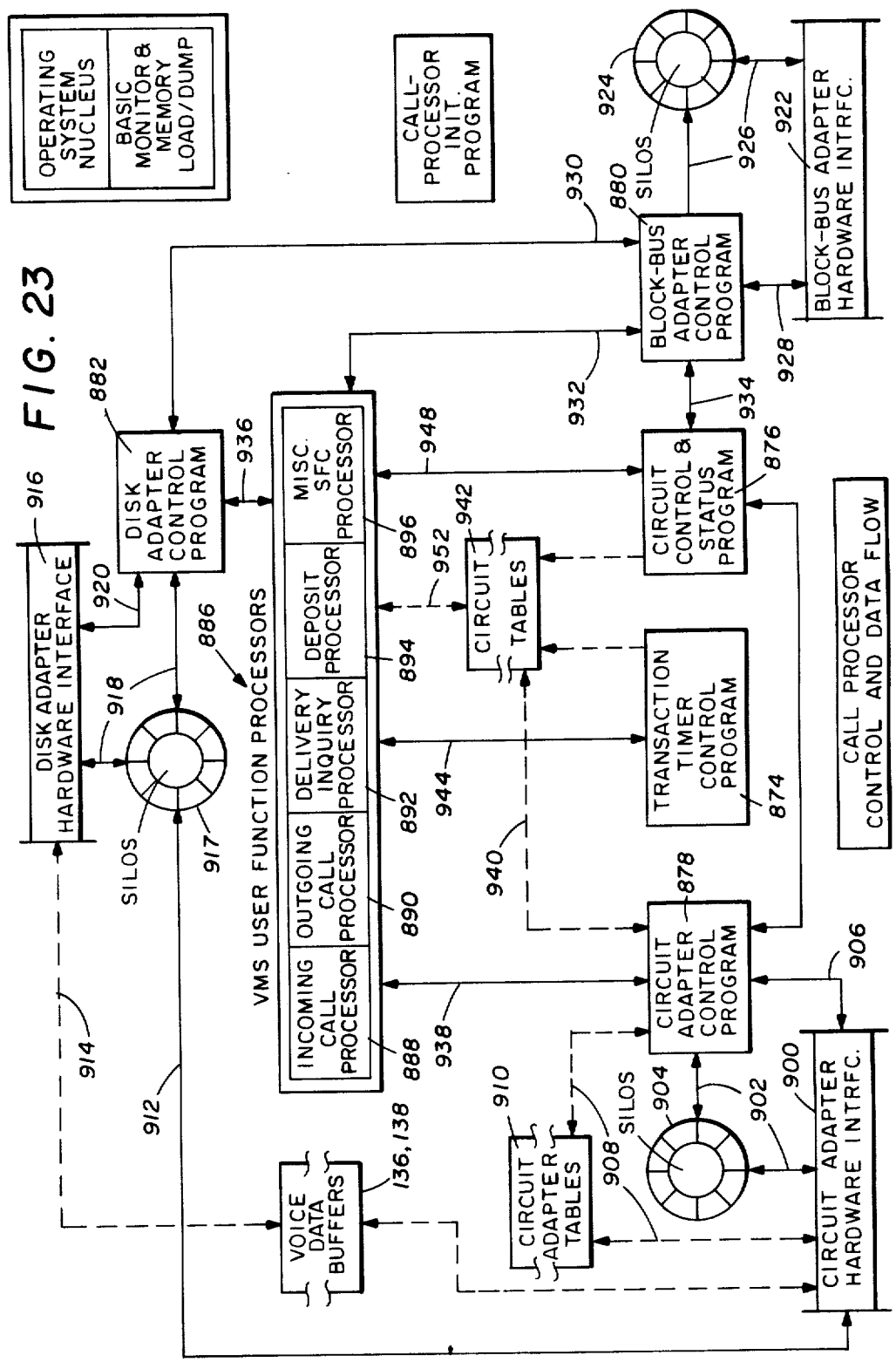

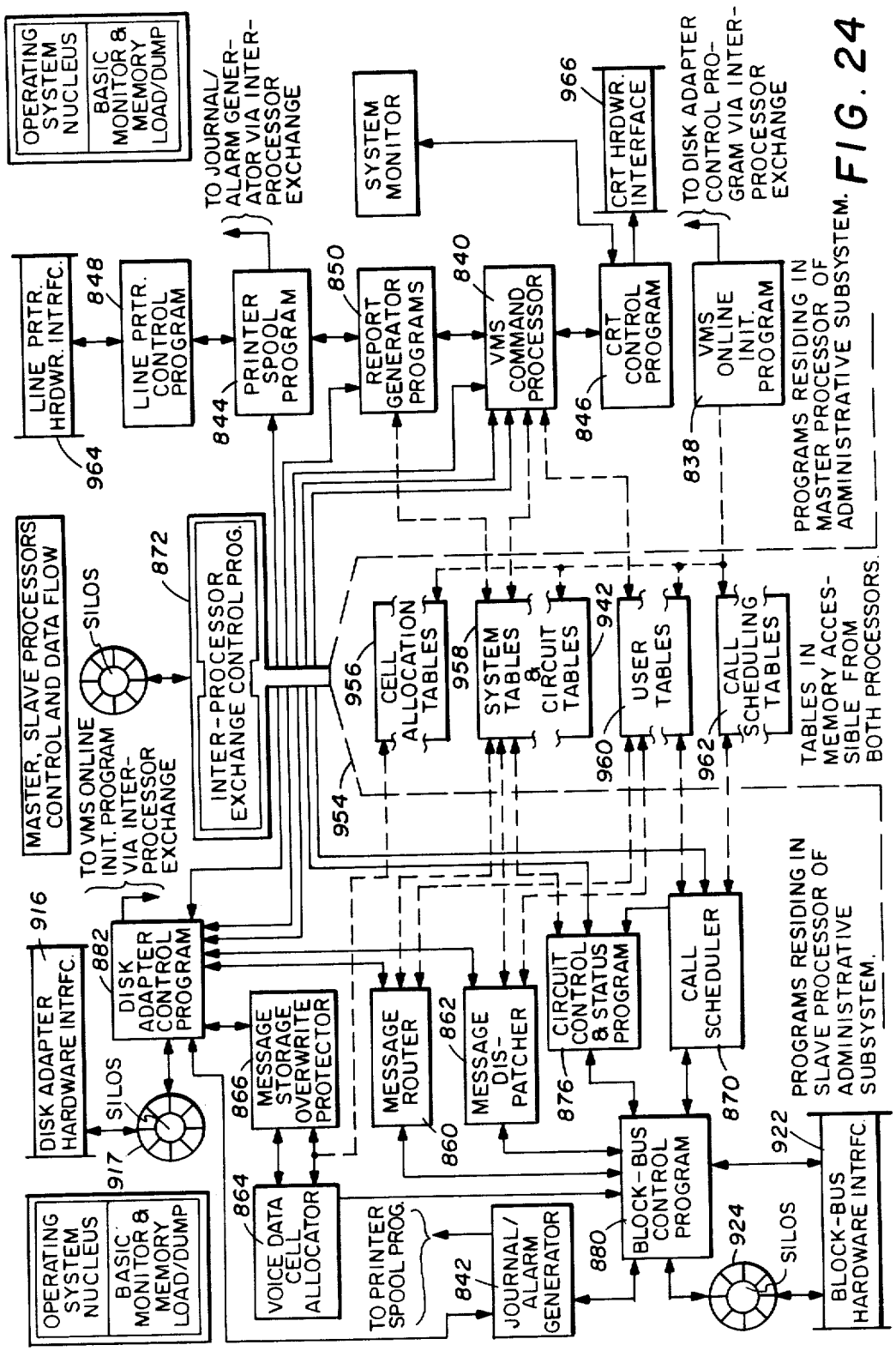

ELECTRONIC AUDIO COMMUNICATION SYSTEM

TECHNICAL FIELD

This invention relates to telecommunication systems, and more particularly to an electronic digital signal processor controlled telecommunication system for the deposit, storage and delivery of audio messages.

BACKGROUND ART

The present day telephone system provides means for its subscribers to verbally communicate with one another. The verbal communications must occur in real time and require that the sender and recipient have simultaneous access to their telephone stations for communication. If the sender is unable to initially place the call at a time when the recipient has access to his telephone, the sender must continue to repeat the call until the recipient is present. Similarly, if the sender desires to send the same verbal message to a number of recipients, he must repeat this process of establishing telephone contact with each recipient and repeating the message. Thus, the present day method of delivering verbal communications is time consuming, and in the business community the time spent in such present day verbal communications is inefficient and recuces personal productivity.

While auxiliary devices, such as telephone recording systems, may be installed for individual telephone sets, such devices do not fill the need for the rapid and efficient delivery of verbal messages in the business community. A need has thus arisen for a centralized telecommunications system which eliminates many of the inconveniences, inefficiency and time consuming requirements of the existing telephone network. The telecommunications system of the present invention overcomes many of the disadvantages, expense and inefficiency associated with the existing telephone networks, and it provides an efficient method to improve verbal communications between subscribers of a communication system employing the present invention.

In accordance with one embodiment of the present invention, subscribers within the system can deposit a verbal message in memory and select the addressees to receive the message. The memory means controlled by an electronic digital signal processing means stores the deposited verbal message along with the addresses of the recipients. A communications system then automatically takes over the function of delivering the messages to the addressees and notifies the sender within a predetermined period of time of any messages that have not been delivered. The user depositing a message in the system may provide the system with a number of addressees for automatic delivery of the stored message without requiring any further time by the user sending the message.

The system enables the user to control the recording operation through signals from the user's telephone. The system has prerecorded "canned" messages to be played back to the user to advise them of his progress in using the system and provide instruction. The system may require the user to enter an authorization code which is checked for validity prior to access to the message deposit function of the system. If a stored message is not delivered to the intended recipient within a predetermined period of time, e.g., next business day, it would be readdressed to the sender informing him of the nondelivery of the message.

The system will attempt to automatically deliver the message to each of the message recipients a predetermined number of times at predetermined time intervals. The user receiving notification from the system of the message to be delivered may enter a unique authorization number which is validated by the system prior to voice message delivery. After receipt of each message, the recipient is provided with means to instruct the system to redirect the message, reply to the message by depositing a message of his own, store the message in a verbal file folder, acknowledge message receipt or save the message for a predetermined period of time, e.g., one complete business day. The playback of the voice message may be controlled by the user receiving the message through the telephone station.

A user may access the telecommunication system of the present invention by telephoning the system from a telephone outside the system's network to determine if there are any messages for the user. The system includes prerecorded "canned" messages which inform the user of the number of messages addressed to him and provides the user with instructions on how to receive the messages.

BRIEF DESCRIPTION OF DRAWINGS

Other objects and advantages of the present invention will be apparent from the following Detailed Description of the preferred embodiments thereof and from the attached Drawings of which:

FIG. 4 is a block diagram view of the call processor subsystem of the Voice Message System of FIG. 3;

FIG. 5 is a block diagram view of the communication port interface port driver modules and codecs connecting to telephone handsets;

FIG. 6 is a block diagram view of the administrative subsystem for the Voice Message System of FIG. 3;

FIG. 7 is a block diagram view of the storage subsystem of the Voice Message System of FIG. 3;

FIG. 8 is a block diagram view of the port driver subsystem of the communication port interface of FIG. 5;

FIG. 9 is a block diagram view of the Codec of the port driver subsystem of FIG. 8;

FIGS. 10a to 10m are the schematic drawings of the Universal Control Board programmable to function as the communication port interface disc adapters and block transfer bus interface of the call processor subsystem of FIG. 4, the expander of the communication port interface subsystem of FIG. 5 and the disc adapters and block transfer bus interface of the administrative subsystem of FIG. 6.

FIG. 11 is a flow chart of the message deposit function of the voice message system;

FIG. 12 is the flow chart of the process user I.D. subroutine of the message deposit function of the voice message system;

FIG. 23 illustrates the control and data flow for the programs running in the call processors; and FIG. 24 illustrates the control and data flow for the programs residing in the master and slave processors of the administrative subsystem.

DESCRIPTION OF PREFERRED EMBODIMENT

Figure 1:
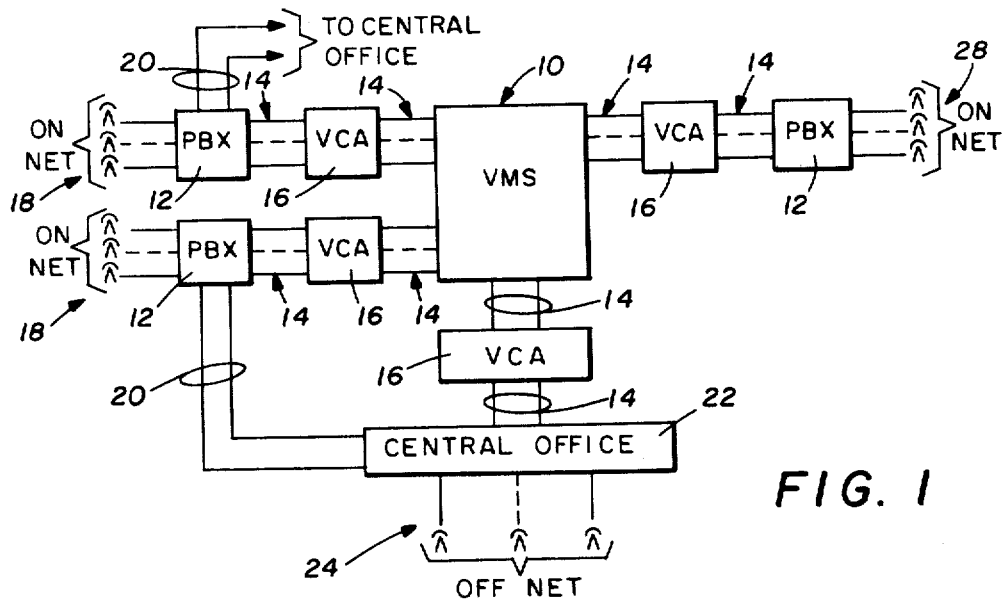
FIG. 1 illustrates a Voice Message System connected with the multiple private exchanges of a customer and the central office of the telephone company.

Referring to FIG. 1, a Voice Message System advanced verbal communication system (hereinafter "VMS") of the present invention is generally identified by the reference numeral 10. ("Voice Message System" is a trademark of Electronic Communication Systems, Inc.) The VMS system 10 is illustrated connected with a user's telephone communications network. The VMS system 10 is not limited to the particular telephone communications network illustrated in FIG. 1, as the present invention is capable of providing an improved communications network for a variety of user's telephone systems.

The telephone communications network illustrated in FIG. 1 includes multiple Private Branch Exchanges 12 (hereinafter "PBX 12") interconnected by tie lines 14 through Voice Connecting Arrangements (hereinafter "VCA") 16 to the VMS 10. The VMS 10 can also be connected to a PBX 12 with station lines. The VCA unit is supplied by the telephone company pursuant to Federal Communication Commission's tariff regulation to provide a line of demarcation between a private user's equipment and the telephone company's equipment. In addition to representing what are referred to as Private Branch Exchanges the term "PBX" also includes but is not limited to PABX (Private Automatic Branch Exchange), EPABX (Electronic Private Automatic Branch Exchange) and CBX (Computerized Branch Exchange), in addition to various off premises switching systems.

The user's telephones 18 connected to the PBX's 12 have access to the VMS 10 and are generally referred to as being on the network or "ON NET." The features of the VMS 10 may be utilized by a small customer with a single PBX 12 or by much larger customers having multiple PBX's 12 interfaced with a single VMS 10. Of course, the PBX's 12 of a large corporate customers may be separated and located in distant physical facilities. Remotely located PBX's 12 may be interconnected to a central VMS 10 by other means than the tie lines 14, e.g., they could be connected by a microwave relay system.

The user's PBX's 12 are also connected through telephone lines 20 to a central office 22, of the telephone company. In addition, the central office 22 is interconnected through tie lines 14 and VCA 16 to the VMS 10. The VMS 10 can also be connected to the central office 22 through central office trunks. Telephones 24 outside the customer's own telephone communications network or "OFF NET" allow a user access to the improved communication capabilities provided by the VMS 10.

Figure 2:
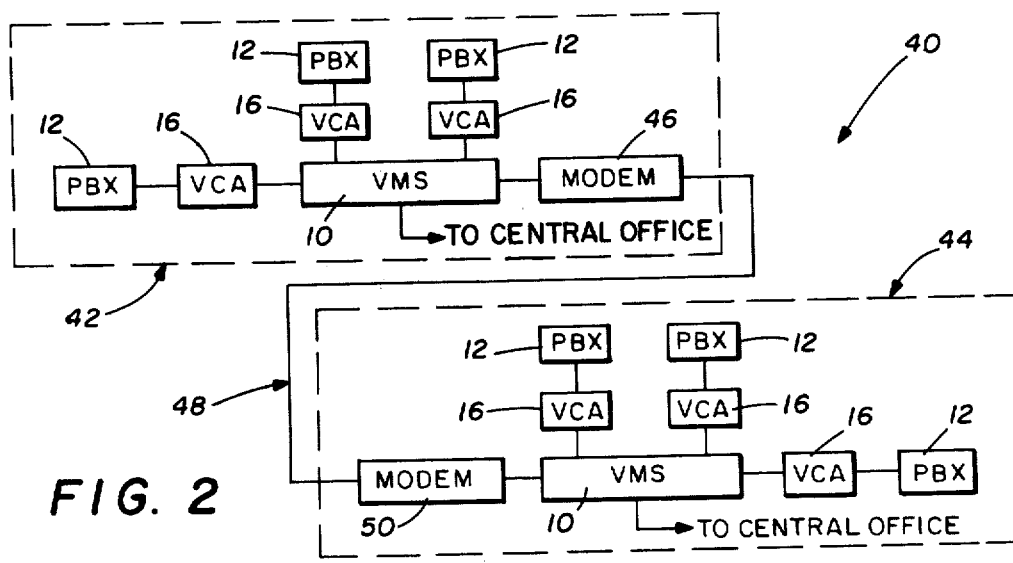
FIG. 2 illustrates a network of Voice Message Systems.

Referring to FIG. 2, a first VMS 10 is interconnected to a user's telephone communications network as illustrated in FIG. 1 and described above. The first VMS 10 is interconnected to a second VMS 10 to form a network of VMS systems 40. The first VMS 10 interconnected with its user's telephone communication equipment comprises a first node 42 of network 40, while the second VMS 10 with its user's telephone communication equipment comprises the second node 44 of network 40. The first VMS 10 is interconnected through a MODEM 46 for modulating the communications information from the first node 42 for transmission via the transmissions link 48 to a MODEM 50. The MODEM 50 demodulates the information for use by the second VMS 10 of the second node 44. The transmission link 48 could comprise a microwave relay system for connecting nodes 42 and 44 of the VMS network 40. Such a transmission link 48 could be transmitted through a satellite communications system to provide an interconnection between distant VMS systems 10. Of course, the number and arrangement of interconnected VMS systems 10 are not limited to the arrangement of VMS network 40 of FIG. 2.

Figure 3:
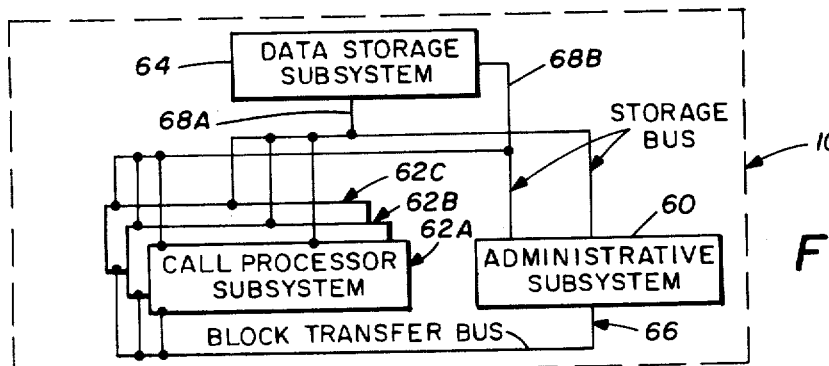
FIG. 3 is a block diagram of the Voice Message System of FIGS. 1 and 2.

Referring to FIG. 3, the VMS 10 of FIG. 1 includes the following subsystems: an administrative subsystem 60, call processor subsystems 62A–62C, and a data storage subsystem 64. There is only one administrative subsystem 60 and data storage subsystem 64 for each VMS system 10, but there may be multiple call processor subsystems 62A–62C. The number of call processor subsystems 62A–62C required is a function of the number of telephone lines interfacing with the VMS 10. Thus, a VMS 10 may have one call processor subsystem 62A or any number of such subsystems. While there is one data storage system 64 for the VMS 10, the size of the data storage system 64 may vary, depending upon the number of disk files required for operation of the VMS 10. The data storage subsystem 64 functions as the storage medium for audio messages in the system. A message deposited from a caller is stored in the VMS system 10, and the message is later delivered to the addressee. Instructional messages are also stored in the data storage system 64 to guide the user in using the VMS 10.

A block transfer bus 66 allows each call processor subsystem 62A–62C to be connected to the administrative subsystem 60, as well as allowing each of the call processor subsystems 62A–62C to communicate with one another.

Data storage buses 68A–68B connect the administrative subsystem 60, the call processor subsystem 62A–62C and the data storage subsystem 64. The administrative subsystem 60 and each of the call processor subsystems 62A–62C have access to each of the data storage buses 68A–68B. The two data storage buses 68A–68B serve two functions. First, it provides redundancy in the VMS system 10, so that, if data storage bus 68A misfunctions, data storage bus 68B allows the VMS 10 to continue to operate. Secondly, when both of the data storage buses 68A–68B are functioning it doubles the bandwidth of the data to be transmitted between the data storage system 64 and the call processor subsystems 62A-C and administrative subsystem 60.

Referring to FIG. 4, the call processor subsystem 62A is illustrated in block diagram form. A single board computer 70 contains a microprocessor, some memory storage, and some input/output device interfaces. The single board computer 70 may be implemented by Intel's single board computer, from Intel, Model Number 80/30. The Intel 80/30 computer includes an 8085 microprocessor, a 16K RAM, 8K ROM, as well as some input/output device interfaces.

A call processor memory 72 provides memory for the call processor subsystem 62A and may be implemented by one or more individual boards containing RAM memory. A single board providing 64K bytes of RAM memory may be utilized as the call processor memory unit 72 and is commercially available from Intel as Model No. SVC064. A communications port interface 74 provides access to the communication port modules 90 of FIG. 5 described hereinbelow. Two identical disk adapters 76 and 78 interconnect with the data storage subsystem 64 of FIG. 3 through data storage buses 68A and 68B. Finally, a block transfer bus interface 80 is a hardware device required to interconnect with the block transfer bus 66 of FIG. 3.

The communication port interface 74, disk adapters 76 and 78, and the block transfer bus interface 80 are all implemented with an identical electronic unit, identified as a Universal Control Board. A Universal Control Board contains an Intel 8085 microprocessor, a RAM memory device (approximately 500 bytes), a ROM memory device (approximately 2K–4K bytes), and a digital data bus interface. A Universal Control Board's function is determined by the program controlling the microprocessor. The schematic of a Universal Control Board is illustrated in FIGS. 10a-10m and described hereinbelow.

In addition to the memory provided in each of the Universal Control Boards, the communication port interface 74, disk adapters 76 and 78 and block transfer bus interface 80 all have access to the memory 72 of the call processor subsystem 62A. Thus, the microprocessors of these Universal Control Boards communicate with the single board computer 70 through the shared memory unit 72.

Referring now to FIG. 5, the communication port interface 74 of FIG. 4 interfaces with the communication port driver modules 90A-B through a communications port digital data bus 88. The communication port driver modules 90A-90B are identical with one another, and each port driver module 90A-B may include a maximum of 16 identical port drivers 92. An expander 94 is a device for expanding the communications port data bus 88 to the 16 port drivers 92 of each module 90A-B. The expanders 94 are also implemented by a universal control board, illustrated in FIGS. 10a-10m and described hereinbelow. Each port driver 92 is directly connected to a CODEC 96. The CODEC 96 is an abbreviated term for a circuit that functions as a coder/decoder. The CODEC 96 transforms the analog voice signal to a digital bit stream for processing in the VMS 10. The translated digital bit stream is fed up into the port driver 92 for distribution to the remainder of the VMS system 10. In addition, in transmitting a recorded message outbound from the VMS 10 to the user, the outbound digital bit stream comes from the port driver 92 into the CODEC 96 where it is translated back into an analog voice signal which is fed into the receiver of the telephone 18 of the user. A single communication port interface 74 can drive up to 32 port drivers 92, which is equivalent to 32 telephone circuits to the VMS 10.

As required by the FCC tariff regulations, the CODEC 96 interfaces through a voice connecting arrangement 98 with the telephone 18 of the user.

FIG. 6 illustrates the hardware implementing the administrative subsystem 60 of FIG. 3. The hardware implementing the administrative subsystem 60 is very similar to that implementing the call processor subsystem 62A illustrated in FIG. 4 and described above.

A single board computer 100 (hereinafter "SBC 100") operates as the central processing unit for the administrative subsystem 60, and it is implemented by a programmable single board computer, commercially available from Intel, Model No. 80/30. The SBC 100 has one input/output interface 102 connected to a cathode ray terminal 104, which serves as the operator's console for the VMS 10. The second input/output interface 106 of the SBC 100 drives a line printer 108. The line printer 108 functions to produce reports and status information concerning the operation of the VMS 10, and it also displays alarms for abnormal conditions during the system operation. One such alarm condition would result from the failure of a recorded message to be transmitted from the VMS 10 in a predetermined period of time.

A memory unit 110 comprised of printed circuit boards provides the memory for the administrative subsystem 60. The memory unit 110 may be made up of one or more individual printed circuit boards, each having 64K bytes of RAM. These printed circuit boards are commercially available from Intel, Model SBC064. A nonvolatile memory unit 112 provides memory for the administrative subsystem 60 so that the data stored in memory is not destroyed if the system loses power. The memory unit 112 could also be implemented with core memory having a capacity of 8 to 16K bytes.

Two identical disk adapters 114 and 116 interconnect through the data storage buses 68A–68B to the data storage subsystem 64 of FIG. 3. The disk adapters 114 and 116 are implemented with a Universal Control Board having its microprocessor programmed for the unit to run as a disk adapter. Finally, a block transfer bus interface 118 is connected to the block transfer bus 66 to the call processor subsystem 62A of FIG. 3. The block transfer bus interface 118 is also implemented with a Universal Control Board having a microprocessor programmed to control the unit's operation.

FIG. 7 is a block diagram view of the storage subsystem 64 of the VMS 10 of FIG. 3. FIG. 7 illustrates two identical disk storage units 120 with their associated disk controller 122. Each disk controller 122 interfaces with the remainder of the system through disk ports 124A and 124B through the data storage buses 68A and 68B. While FIG. 7 illustrates two identical disk storage units 120 with their associated disk controllers 122, the disk storage subsystem 64 consists of any number of such identical units. The configuration of the VMS subsystem 10 of FIG. 3 requires a minimum of two disk storage units 120, but additional units may be added to increase the storage capacity of the system.

The entire disk storage unit 120 may be implemented by using a Storage Technology Corporation disk drive, Model Number 2700. The STC Model 2700 disk storage unit 120 is a rotating magnetic disk having a capacity for 200 million 8 bit bytes of digital or binary information. Each disk unit contains its own dedicated disk controller 122 which is built around a microprocessor. The disk controller 122 may be implemented with a Motorola microprocessor, Model Number 6801, 64K bytes of RAM memory, and it also includes a special purpose digital hardware to drive the input/output disk ports 124A and 124B into the disk unit 120 and to directly control the disk storage unit 120. As additional disk storage units 120 are added to the system, their associated disk ports 124A and 124B are connected to the data storage buses 68A and 68B.

The VMS system 10 is provided with a minimum of two disk storage units 120, since the functioning of the disk storage units 120 is essential to the entire VMS system. The two data storage buses 68A and 68B are provided to achieve redundancy in the system. If one of the buses goes out of service, then the other bus still has access to all of the disk units 120 through the single remaining bus. With a single data bus in operation, the system will still operate, but it will not have the same throughput capability in terms of the amount of data that can be processed by the VMS 10. However, when both disk storage buses 68A and 68B are running at normal operation, this allows twice as much information to be fed into and out of the storage system 64 than could be accomplished with a single data storage bus.

A separate disk controller 122 dedicated to the operation of each disk storage unit 120, enables blocks of information to be more efficiently transferred within the VMS 10. For example, in transferring a block of information from the call processor subsystem 62A or the administrative subsystem 60 to or from the disk storage unit 120, the transfer does not occur in real time from one of the data storage buses 68A or 68B onto the disk unit 120. The block of information is transferred into the RAM storage of the disk controller 122, and then the disk controller 122 controls the operation of transferring the block of information from its RAM directly into the disk unit 120. In this way, the VMS 10 storage bus 68A or 68B is not tied up for the period of time it takes to write a block of information directly onto the disk 120; rather, it is occupied only for the period of time it takes to transfer that block of information into the RAM of the disk controller 122.

FIG. 8 is a block diagram view of one of the port drivers 92 of FIG. 5. The central contol unit of the port driver 92 is an Intel 8085 microprocessor 130 connected by an internal bus 132 to the remainder of the port driver system 92. The microprocessor 130 is programmed to control a digital logic hardware device, identified as a multibus interface logic unit 134. The multibus interface logic 134 is an 8 or 16 bit wide parallel data path serving as the electrical interface between the expander 94 in all of the port drivers 92. The multibus interface logic 134 consists of a multibus backpane into which are plugged the boards for the port drivers 92 and expanders 94.

Voice data buffers 136 and 138 are connected to the remaining components of the port driver 92 through the internal bus 132. The voice data buffers 136 and 138 function to temporarily store the incoming or outgoing data bit streams of the digitized voice signal incoming or outgoing to the CODEC 96. The voice data buffers 136 and 138 interface through a CODEC interface logic unit 140 to the CODEC 96. A ROM memory unit 142 stores the program for the microprocessor 130.

The operation of the dual voice data buffers 136 and 138 may be illustrated by the example of digitized voice data being received by the port driver 92 from the CODEC 96. The voice data entering the port driver 92 is temporarily stored in one of the dual voice data buffers 136 or 138. When the selected voice data buffer is full, that entire block of data is transmitted out to the expander 94 up to the communication port interface 74 of the call processor 62A. At the same time when the port driver 92 senses that the first voice data buffer is full, the second voice data buffer is used to store the subsequent voice data from the CODEC. The port driver system 92 is programmed to control the dual voice data buffers 136 and 138 in the transmitting mode and the storing mode. The voice data buffers 136 and 138 are implemented in RAM semiconductor memory in the range of 512-2K bytes.

FIG. 9 is a block diagram of the CODEC 96 of FIG. 5. A delta modulator 150 (hereinafter "DM 150") is connected to the port driver 92. The DM 150 functions as either a coder for converting analog signals to digital signals, or a decoder for converting digital signals to analog signals. The operating mode of the DM 150, whether it is functioning as a coder or decoder, is controlled by one of the interface signals 152 to the port driver 92. The DM 150 implements a particular technique for converting analog to digital and digital to analog.

The DM 150 decodes the digital wave form to an analog signal and passes it through filter 154 which is a voice band filter with a cutoff frequency of approximately 2700 hertz. The analog signal from the filter 154 is fed into the VCA interface logic 156, through the VCA 158 to the ON NET telephone 18. The VCA 158 is required by FCC Tariff Regulations as the line of demarcation between the equipment of the telephone company and the equipment of a private user.

The analog signal from the telephone 18 is transmitted through the VCA 158 and VCA interface logic 156 to an automatic gain control circuit 160, which serves to amplify the analog voice signal from the VCA. The amplified analog signal is then passed through another band pass filter 162 for passing frequencies in the range of approximately 300 hertz to 2700 hertz. The filtered analog signal is then fed into the DM 150, which is functioning as a coder, and transformed into a digital bit stream to be fed to the port driver 92.

The first function of the CODEC 96 has been described above in providing the data path for the incoming and outgoing voice signals from the telephone 18 to the VMS system 10. An ancillary function of the CODEC 96 is provided by the tone receiver 164, which receives the analog wave forms generated by the signal from a touchtone type of telephone 18 and converted to digital information corresponding to the tone received. A tone generator circuit 166 provides the analogous function in converting digital signals from the VMS 10 to the receiver of the user telephone 18. The tone generator 166 functions to generate touchtones as well as progress tones acknowledging the status of the operation of the VMS 10. The tone generator 166 functions to form the outgoing dialing in a touchtone system. A pulse dialing path 168 is provided to receive pulse dialing coming in from a rotary telephone 18, and it also functions to do the outbound dialing to a rotary telephone 18.

FIGS. 10a–10m illustrate the Universal Control Board which is programmable to serve a number of functions in the VMS 10 described above. Universal Control Boards are utilized in the call processor subsystem 62A illustrated in FIG. 4 to function as the communication port interface 74, the disk adapters 76 and 78 and the block transfer interface bus 80. In addition, the expander 94 illustrated in FIG. 5 is implemented with a Universal Control Board. In the administrative subsystem 60, Universal Control Boards are programmed to function as the disk adapters 114 and 116 as well as the block transfer interface bus 118. The storage subsystem 64 illustrated in FIG. 7 utilizes a Universal Control Board to function as the disk controllers 122.

The hardware for implementing the Universal Control Boards is illustrated in FIGS. 10a–10m and described hereinbelow. The hardware of the Universal Control Board is identical for each of the above-described applications in the VMS 10. The programs stored in the ROM of each Universal Control Board determines its function. For instance, the communication port interface 74, disk adapters 76 and 78 and block transfer bus interface 80 of the call processor subsystem 62A comprise individual Universal Control Boards with identical hardware. The software program stored in the ROM determines whether the particular Universal Control Board functions as a communication port interface 74 or disk adapters 76–78 or the block transfer interface bus 80.

Figure 10A:
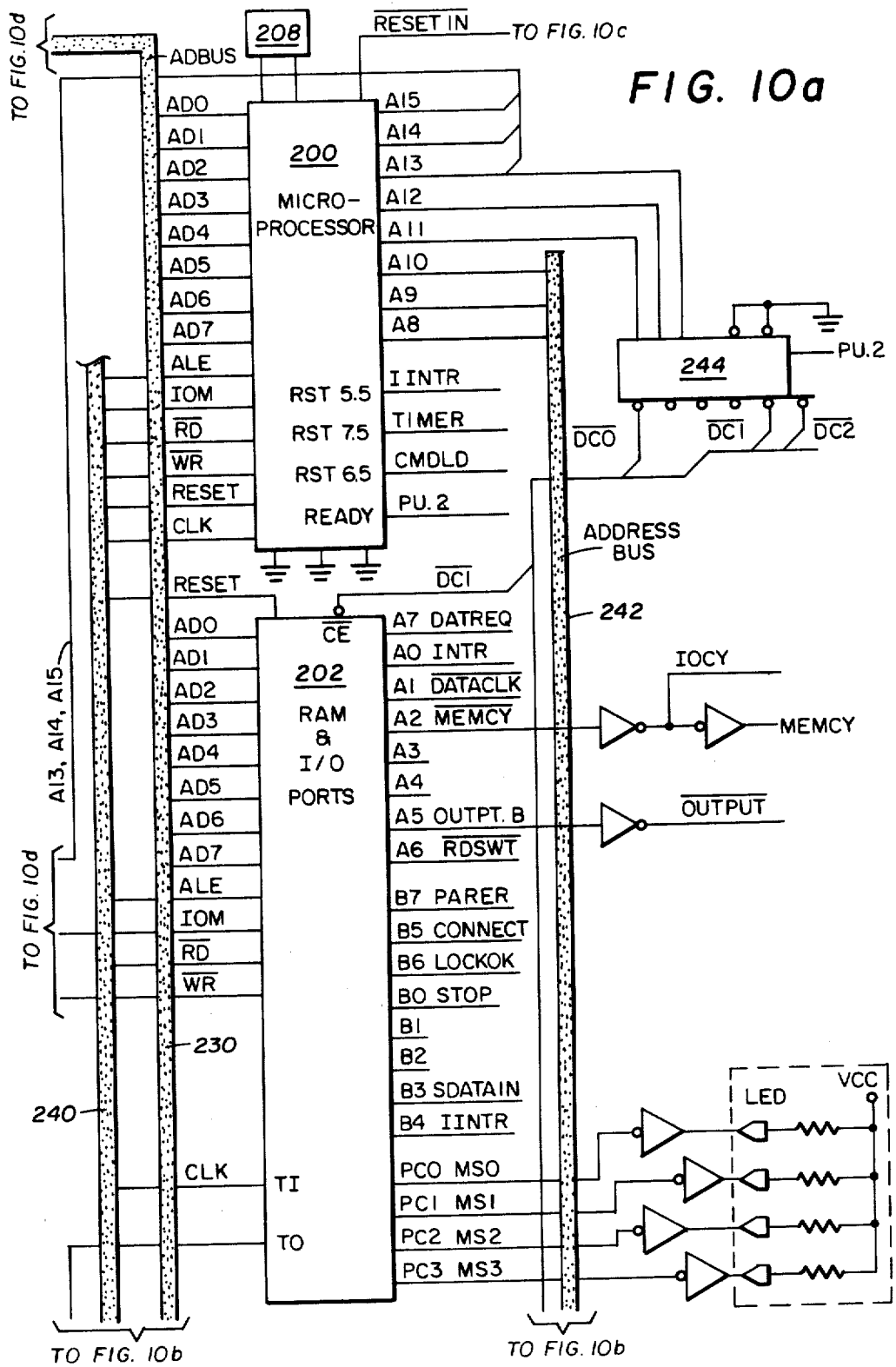
Figure 10B:
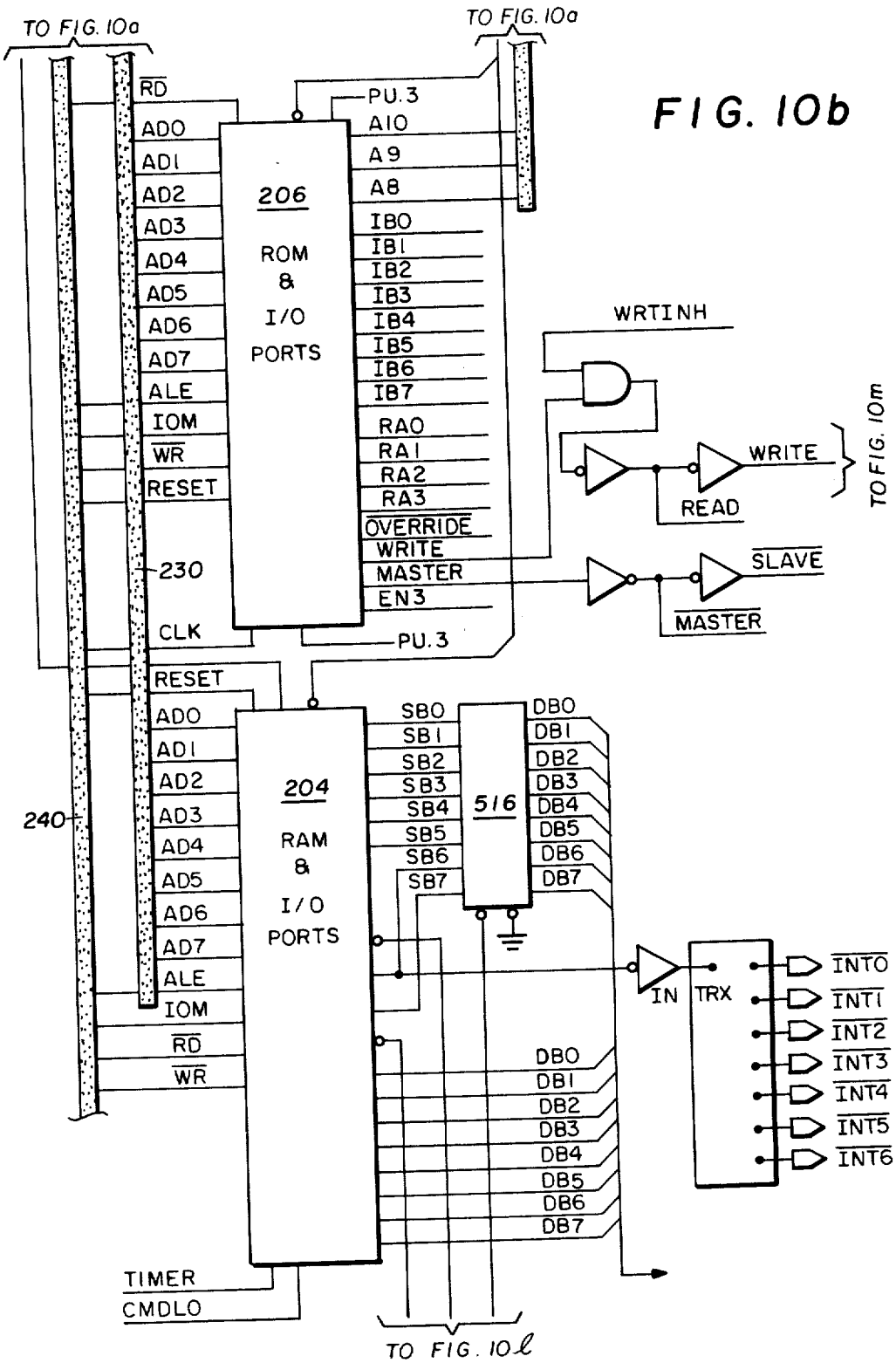
Figure 10C:
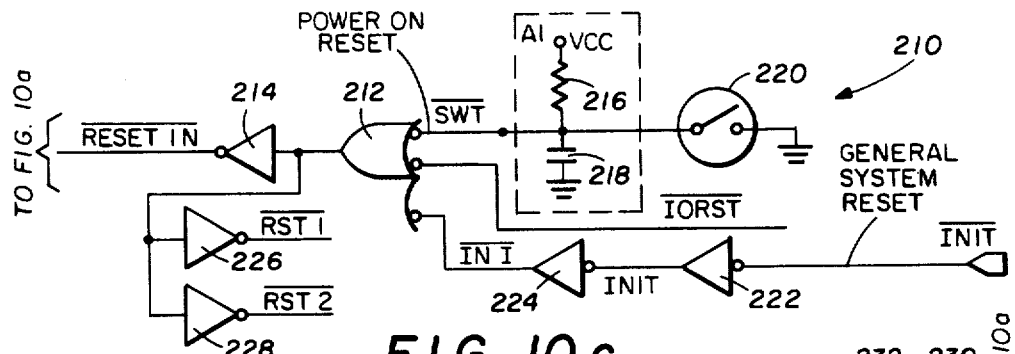

FIGS. 10a, 10b and 10c illustrate the basic microprocessor section of the board and includes the microprocessor 200 and memory input/output combination chips 202 and 204. The chips 202 and 204 have random access memory and I/O port features, while another combination chip 206 has a read only memory in conjunction with I/O ports. Microprocessor 200 is available commercially from Intel as Model No. 8085; the combination chips 202 and 204 with RAM memory are commercially available from Intel Model No. 8155; and the ROM combination chip 206 is available from Intel as Model No. 8755.

A crystal 208 is the source of the clock signal for the microprocessor 200, determining how fast it will run and how much time is allotted for execution of an instruction.

As shown in FIG. 10c, reset circuitry 210 controls the start-up of the microprocessor 200 when it is turned on and provides the means for resetting microprocessor 200. There are three different ways in which the microprocessor 200 may be restarted. First, the "power on" reset signal comes into one pin of the reset OR gate 212 and goes through the inverter 214 to the microprocessor 200. The "power on" reset signal originates when system power is turned on and the resistor 216 slowly charges the capacitor 218. Manual reset switch 220 is provided to manually discharge the capacitor 218 to cause a reset any time it is desired by the operator. The second method of restarting the microprocessor 200 is from the IORST signal originating from another Universal Control Board connected to the same multibus to provide a reset signal to reset OR gate 212. The third way to reset the microprocessor 200 is through the general system reset signal passing through inverters 222 and 224 to one pin of the reset OR gate 212. This signal is a general system reset and typically means that the reset occurred because everything in the system has been reset. This general system reset signal may be originated from another push button located elsewhere in the system, like reset switch 220, which individually resets this particular microprocessor 200.

The reset signal from the OR gate 212 is fed separately through inverters 226 and 228 to become reset signals "RST1" and "RST2" to provide logic resets to other logic on the Universal Control Board other than the microprocessor 200.

Figure 10D:
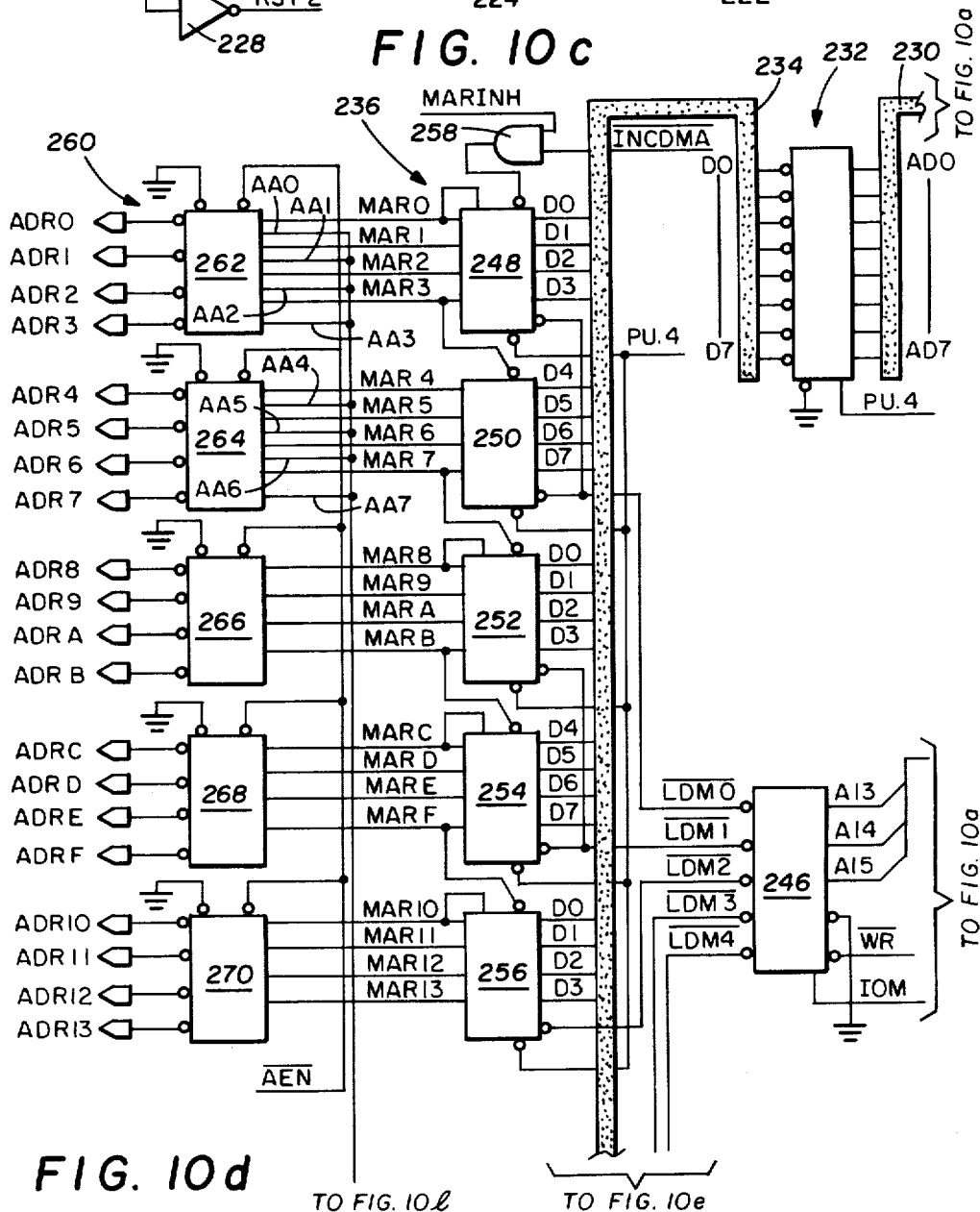
Figure 10F:
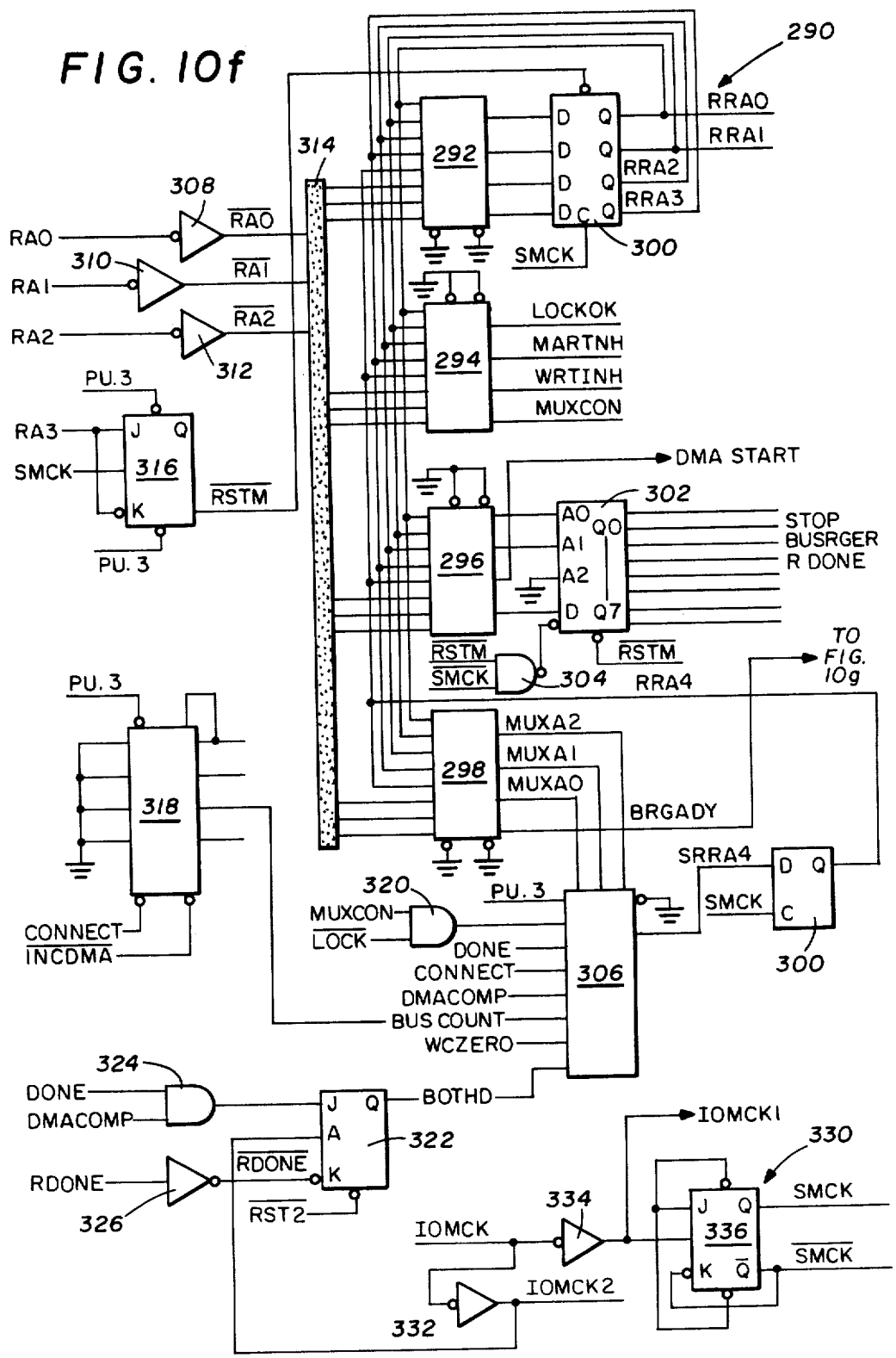
Figure 10H:
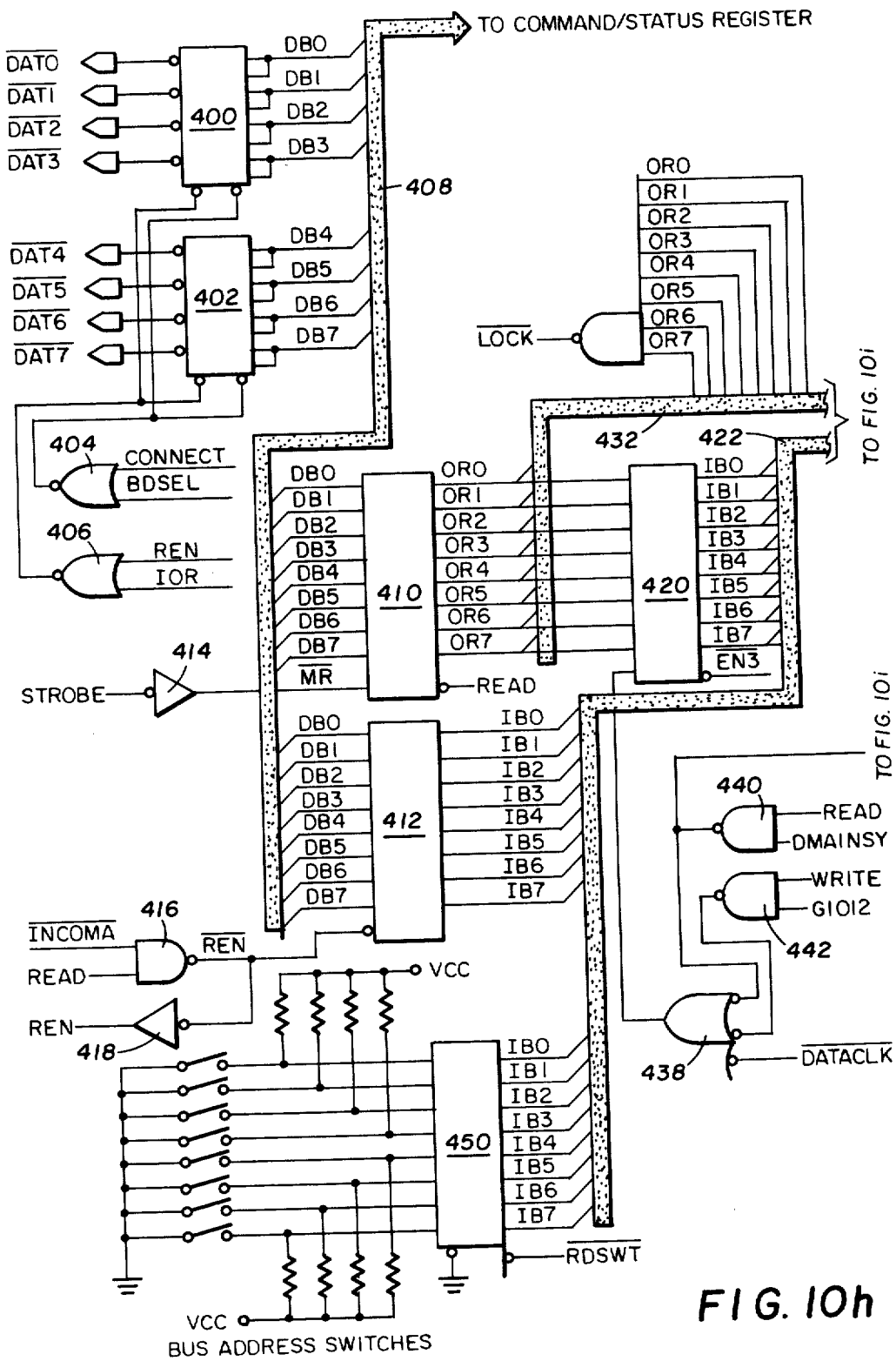
Figure 10I:
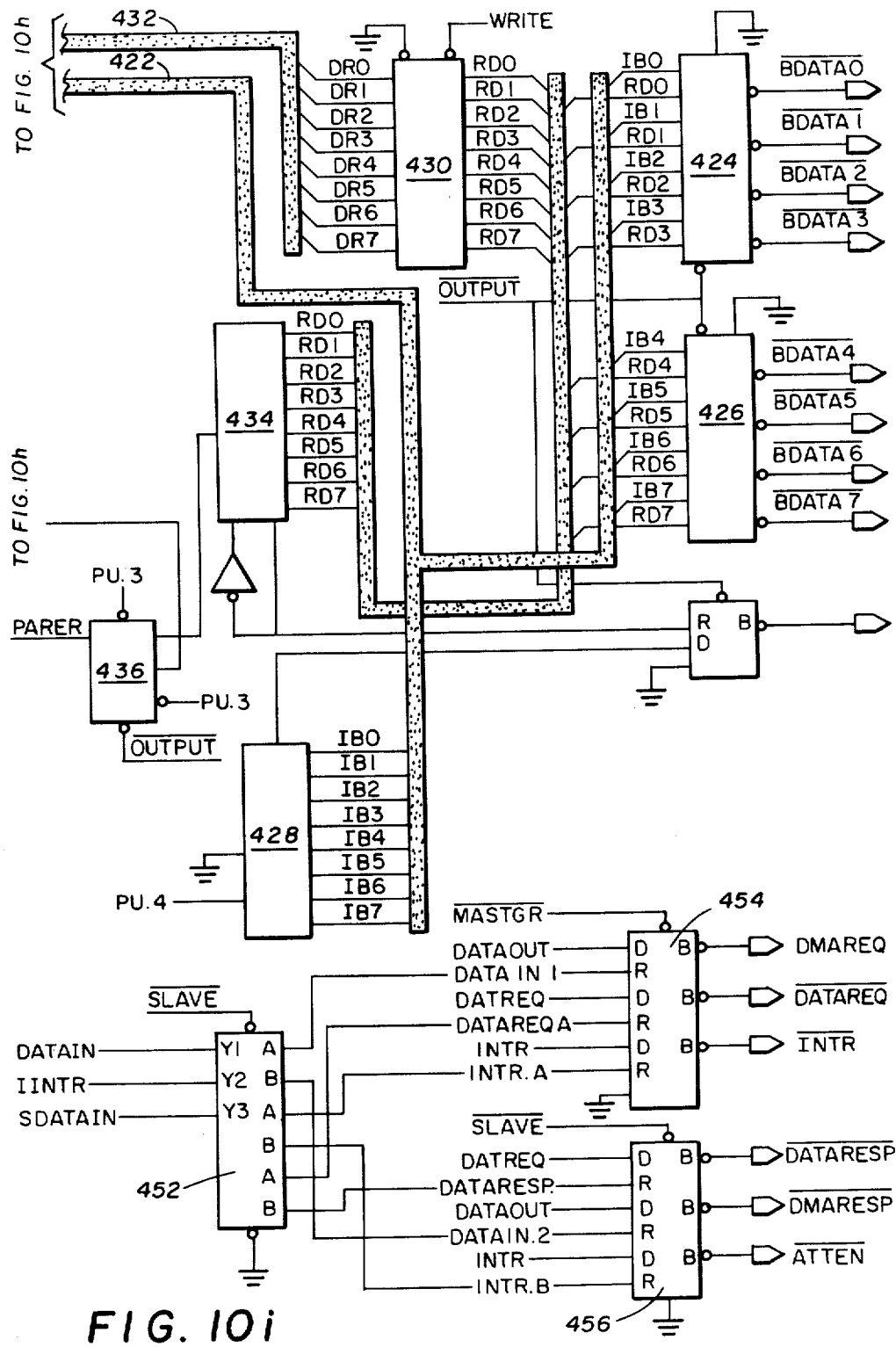
Figure 10J:
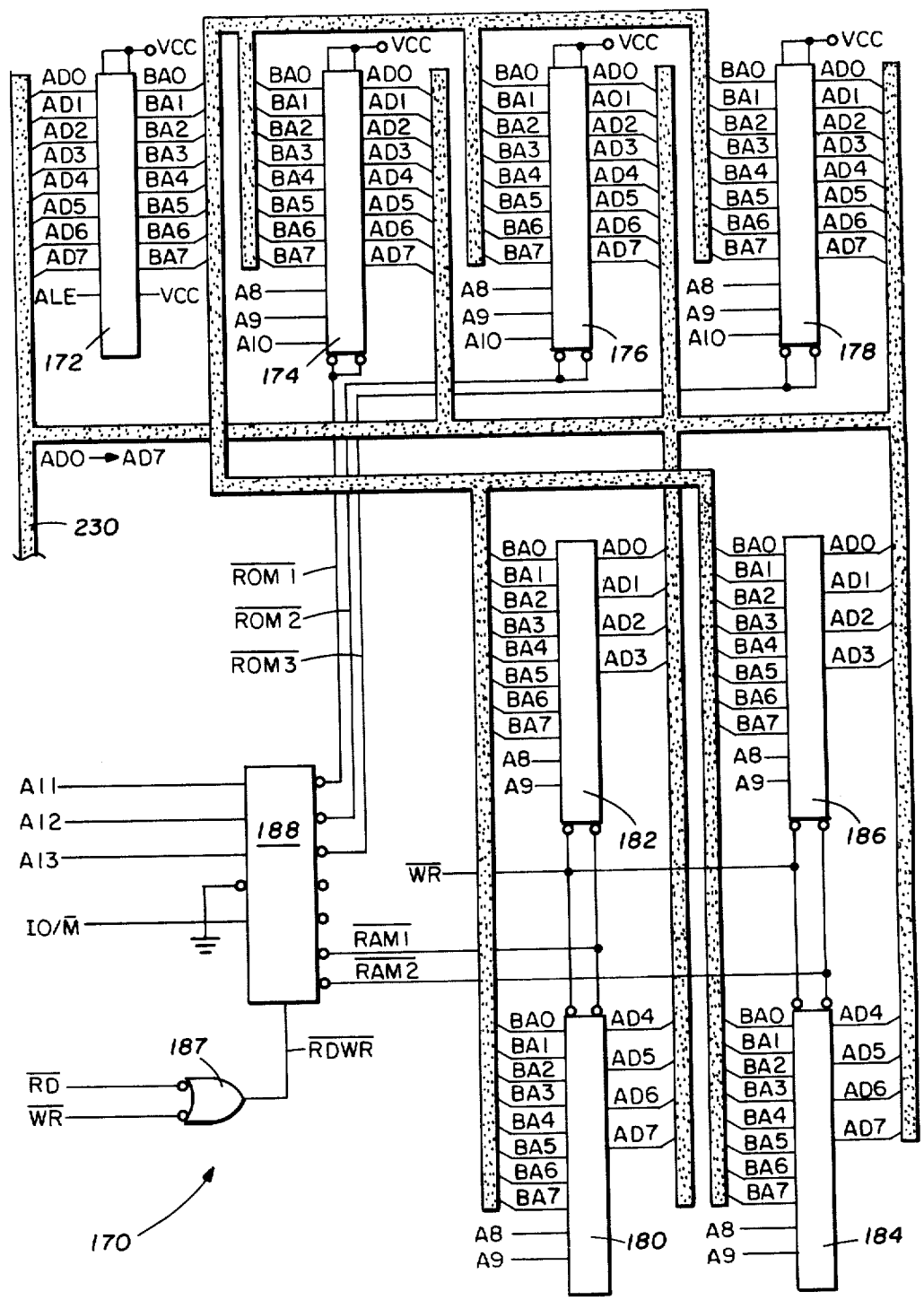

As shown in FIG. 10j, an extended memory unit 170 is provided as an extension to the memory of the microprocessor 200. The extended memory 170 comprises four functional units: (1) an address latch 172, (2) EPROM memory units 174, 176 and 178, (3) RAM memory units 180, 182, 184 and 186, and (4) address decoding chips 187 and 188.

The address latch 172 is conditioned by the control signal ALE to capture the address information (AD-0–AD7) on the address data bus 230. The latched address is stored in address latch 172, which feeds its output to all the EPROM chips 174, 176 and 178 as well as all the RAM chips 180, 182, 184 and 186.

The address decoding chips 187 and 188 decode the high order address signals A11, A12 and A13, as well as the control signals $\overline{RD}$ and $\overline{WR}$. These signals are used to generate the output signals $\overline{ROM\ 1}$ and $\overline{ROM\ 2}$, $\overline{ROM\ 3}$, $\overline{RAM\ 1}$, and $\overline{RAM\ 2}$. These signals control the activation of the individual EPROM chips 174, 176 and 178 and RAM chips 180, 182, 184 and 186.

The EPROM memory units 174, 176 and 178 contain the stored program of the Universal Control Board's 8085 processor. The combination of the address latch signals and the individual address decode signals control which EPROM chip and which byte in the EPROM chip is selected. The EPROM chips apply the selective data to the bus 230.

The RAM memory units 180, 182, 184 and 186 contain variable bytes of data which are used by the Universal Control Board's 8085 processor. The RAM memory chips 180, 182, 184 and 186 are selected by the address decode signals $\overline{RAM\ 1}$ and $\overline{RAM\ 2}$. The RAM memory units 180, 182, 184 and 186 are selected in pairs, each chip in the pair asserts four bits on the address data bus 230. Signals from the address latch 172 control which byte in the selected RAM chip is asserted on address data bus 230. The RAM chips 180, 182, 184 and 186 also use the signal WR to store data in the RAM chip from the address data bus 230.

As shown in FIGS. 10a, 10b and 10d, an address data bus 230 is a bidirectional bus operating in a time multiplexed fashion. Part of the time the bus 230 represents an address memory that needs to be involved in a particular instruction, and at other times the bus 230 represents data that is involved in a particular transaction and an instruction. This means the data can be going into or out of memory or into or out of an input/output port. The address data bus 230 connects the signals AD-0–AD7 to one side of the bus repeater 232 for regenerating the data bus. The data signals D0–D7 are connected through a data bus 234 to a memory address register 236 and a word count register 238. A control bus 240 interconnects the various controls and timing signals from the microprocessor 200 to the rest of the components in the combination chips 202, 204 and 206 to instruct these devices in handling the signals on the address data bus 230.

The ALE signal originating in microprocessor 200 is the address latch used to tell the other components when the address data bus has an address on it. The other chips, 202, 204 and 206, have internal address registers which use the strobe to latch whatever information is on the address data bus 230 to save the address.

The IOM signal originates with the microprocessor 200 to tell the other components connected to the microprocessor 200 that the particular data transaction is either input/output or memory. The state of the signal tells the combination chips 202, 204 and 206, having input/output functions and memory functions, that the data on the data lines and address on the address lines should be used to control either the input/output ports or the memory ports. If the IOM signal is high, this represents an input/output transaction; and if the signal is low it represents a memory transaction, either a read or write transaction.

The next strobe signal of the microprocessor 200 is the $\overline{RD}$ read signal which is a timing signal to tell the other components that the microprocessor 200 is to perform a read function.

The next strobe signal is the $\overline{WR}$ write strobe originating with the microprocessor 200 to tell the other system components that the microprocessor 200 is to perform a write transaction, i.e., that it's going to originate in the microprocessor and end up in an external component.

The next control signal is the RESET signal originating in the microprocessor 200 which initializes the other combination chips 202, 204 and 206.

The final control signal on the control bus 240 is the CLK signal, which is a timing signal to the other combination chips 202, 204 and 206 so that the whole system is synchronized.

The remaining signals, A8–A15, originating from the microprocessor 200, are totally dedicated to the address function. An address bus 242 connects the address signals A8–A10 in the microprocessor 200 to the ROM combination chip 206 to select which system component is to be involved in a particular input/output or memory transaction. As shown in FIG. 10a, address signals A11–A13, connected to an address decoder 244, may further select one of the chips 202, 204 and 206 in the system to be involved in a transaction through its output signals $\overline{DC0}$, $\overline{DC1}$, and $\overline{DC2}$. As shown in FIG. 10d, the address signals A13–A15 are connected to an input/output decoder 246 to decode these addresses into five unique signals to select certain registers to control the memory address register 236 and the word count register 238. Of the five decoding signals provided by the input/output decoder 246, three of them, $\overline{LDM0}$, $\overline{LDM1}$ and $\overline{LDM2}$, are used by the memory address register 236. The remaining two decode signals of the input/output decoder 246, $\overline{LDM3}$ and $\overline{LDM4}$, are used by the word count register 238.

The memory address register 236 consists of address memory registers 248, 250, 252, 254 and 256. The function of the memory address register 238 is to address memory which is exterior to the universal control board and connected to the Intel multibus. The Intel multibus is the main bus which connects all the Universal Control Boards to one system. The memory address register 238 can be loaded through input/output commands to an initial starting address, which allows another controller on the board to command it, incrementing its value through the $\overline{INCDMA}$ signal coming into one pin of AND gate 258. The $\overline{INCDMA}$ signal comes from the multibus timing control circuit 540 on the Universal Control Board. The other signal to the AND gate 258, $\overline{MARINH}$, originates from the ROM sequencer 290 (FIG. 10f) on the Universal Control Board and described below.

The output of the memory address register 236 is transmitted to the address drivers 260, which consist of separate drivers 262, 264, 266, 268 and 270 connected to the memory address registers 248, 250, 252, 254 and 256, respectively. The address drivers 260 take the memory address bits individually from the address registers 248-256 and condition them to be placed on the Intel multibus.

As shown in FIG. 10e, the word count register 238 consists of registers 272, 274, 276 and 278 having their inputs connected to the data bus bar 234 for receiving the data signals D0–D7. The word count register 238 may have a starting count loaded into its registers through an input/output command from the microprocessor 200. The word count register 238 is controlled by the $\overline{INCDMA}$ signal for generating an output signal, word count zero (WCZERO) signal to control how many multibus transactions occur. For protocol on the Universal Control Board, the WCZERO signal is passed through an inverter 280 to output the signal as $\overline{WCZERO}$.

As shown in FIG. 10f, ROM sequencer 290 functions to control most of the logic on the Universal Control Board under the command of the microprocessor 200. The ROM sequencer 290 controls multibus transactions and controls transactions with whatever other device is connected to the universal control board on the other side of its cable.

The ROM sequencer 290 includes very high-speed memories in the form of interconnected PROMS 292, 294, 296 and 298. The input to the PROMS 292-298 is its address and its output is program instruction for other components of the Universal Control Board. The first four bits comprising the output of the PROM 292 is the next address of the ROM program, and it is stored in the next address register 300. The PROM 294 has as its output the four signals LOCKOK, MARINH, WRTINH, and MUXCON, which are applied elsewhere to the Universal Control Board. The PROM 296 has three bits of its program output to control the output latch 302, which is a way for the program to express what it would like to do in terms of output. The output latch 302 implements three signals: "STOP," "BUSRQ" and "RDONE." The output latch 302 is controlled by AND gate 304, having its input terminals connected to 5 megahertz clock signal and the $\overline{RSTM}$ signal. The fourth bit from the PROM 296 occurs in real time and is the DMA START signal, which is applied to the multibus timing control circuit 540 of FIG. 10m. Finally, the last PROM 298 has three of its four bits of the program instruction to control the input multiplexer 306 to sample the various signals to see what their state is. The PROM 298 program output selects the input multiplexer 306 address and the output of the multiplexer stored as part of the next address register 300. The fourth bit of program instruction from the PROM 298 is the BREADY signal to the cable timing control circuit 340 of FIG. 10g.

As discussed above, four of the eight address bits for each of the PROMS 292, 294, 296 and 298 come from the next register address 300. A fifth address bit, RRA4, comes from the output of the input multiplexer 306 through part of the next address register 300. The remaining three address bits of the PROMS 292-298 are controlled by the signals RA0, RA1 and RA2 which come from the input/output port of the ROM combination chip 206 of the microprocessor circuit. The signals RA0, RA1 and RA2 are fed through the inverters 308, 310 and 312 through a PROM control bus 314 to the inputs of the PROMS 292-298. A fourth signal, RA3, from the ROM combination chip 206 is fed to a flip-flop 316 controlled by a 5 megahertz clock signal to generate a reset signal $\overline{RSTM}$ which goes to the next address register 300. The RA3 signal allows the microprocessor 200 to turn off the ROM sequencer 290 when the ROM sequencer 290 has finished a particular function requested of it.

The microprocessor 200 controls the ROM sequencer 290 by the three-bit command RA0, RA1 and RA3 which specifies the program function to be performed, setting a 0 in the RA3 bit which will release the ROM sequencer 290 by taking away the reset. When the ROM sequencer 290 finishes performing its function, it sets the "stop" bit at the output latch 302 which the microprocessor circuit can sample through the RAM combination chip 202, and the ROM combination chip 206 responds by resetting the flip-flop 316, turning the ROM sequencer 290 off. The reset bit $\overline{RSTM}$ also serves as a fail-safe mechanism by allowing the ROM sequencer 290 only a certain amount of allotted time to perform its function. If too much time elapses, then microprocessor circuit performs an error recovery procedure by unconditionally resetting the ROM sequencer 290.

The ROM sequencer 290 includes a multibus cycle counter 318. The multibus cycle counter 318 determines how many multibus transactions have occurred by being incremented by the signal $\overline{INCDMA}$ every time a multibus transaction occurs. By selecting a particular one of the Q outputs of the multibus cycle counter 318, QA, QB, QC, QD, the counter can be adjusted to count by 2, 4, 6 or 8. Multibus cycle counter 318 functions to prevent the ROM sequencer 290 from monopolizing time on the Intel multibus when the ROM sequencer 290 is doing a multibus block transfer. During a multibus block transfer the ROM sequencer 290 in effect locks out the other Universal Control Boards on that bus. Multibus cycle counter 318 causes the ROM sequencer 290 to periodically give up control of the multibus, so that some of the Universal Control Board can use it. The output signal from the multibus cycle counter is the BUSCOUNT signal to one input of the input multiplexer 306.

The input multiplexer 306 allows the ROM sequencer 290 to sample the state of a number of functions. An AND gate 320, input signals $\overline{MUXCON}$ and $\overline{LOCK}$, has its output applied to one input terminal of the input multiplexer 306. The DONE signal from the cable timing control circuit 340 is applied to another input terminal of the input multiplexer 306. The CONNECT signal from the output of the contention logic circuit 460 is applied as another input signal of the input multiplexer 306. The DMACOMP signal is from the multibus timing control circuit 540 another input signal. The WCZERO signal from the word count register 238 is also applied as an input signal.

The final input signal to the input multiplexer is the BOTHD signal from the flip-flop 322. Flip-flop 322 has one pin connected to the output of AND gate 324, having its two inputs connected to the DONE signal from the cable timing control circuit 340, and the DMACOMP signal from the multibus timing control circuit 540. The two "done" signals are connected to the input of the AND gate 324 to set the flip-flop 322. When the ROM sequencer 290 samples the input connected to the BOTHD signal of the input multiplexer 306, it can reset the flip-flop 322 by the RDONE signal originating from the output latch 302 and fed through an inverter 236. The flip-flop 322 may also be reset by the signal $\overline{RST2}$ from the reset circuitry 210.

A clock circuit 330 takes a ten (10) megahertz signal through an inverter 332 and feeds it through the flip-flop 322 to the ROM sequencer 290. The ten (10) megahertz clock signal is also fed through another inverter 334 to a divide-by-two flip-flop 336 to generate a 5 megahertz clock signal and a $\overline{5\text{ megahertz}}$ clock signal for use elsewhere on the Universal Control Board.

As shown in FIG. 10g, cable timing control circuit 340 participates in the bus timing on the cable by originating one of the two signals on the cable and sampling the other. The signal DMAOUT is an output command signal generated by the cable timing control circuit 340 and the DMAIN signal originated on the cable bus driver circuit. The BREADY signal is derived from the fourth output bit of the PROM 298 of the ROM sequencer 290 (FIG. 10f) and is connected to the inputs of NAND gates 342 and 344. A second input of the NAND gate 342 is connected to the WRITE signal from the ROM combination chip 206 of the microprocessor circuit. The NAND gate 344 has inputs from the READ signal from the ROM combination chip 206 and the $\overline{WCZERO}$ from the inverter 280 of the word count register 238. The output of the logic NAND gates 342 and 344 are fed through the OR gate 346 to produce the READY output signal as one input to the AND gate 348. The NAND gate 348 also has its input tied to the DONE signal fed back from the output of the cable timing control circuit 340 and the DMACOMP signal from the output of the multibus timing control circuit 540. (FIG. 10m) The output of the NAND gate 348 is fed through an inverter 350 to one pin of the input multiplexer 352. The input address of the multiplexer 352 is controlled by the state lines STB0, STB1 and STB2 as the output of counter 354. Counter 354 essentially reflects the state of the cable timing control circuit 340. The input multiplexer 352 is sampling the DMAIN signal fed through flip-flop 356 which generates the output signals DMAINSY and $\overline{DMAIN\ SY}$ as the inputs to multiplexer 352.

The output of the input multiplexer 352 goes to the output multiplexer 358 to allow certain signals to occur when the proper input is detected. The output multiplexer 358 waits in state 0 until it receives a logic 1 from the output of the input multiplexer 352 which would cause the output multiplexer 358 to have an output on its state 0, causing a $\overline{STOY}$ signal output. The $\overline{STOY}$ output signal goes through OR gate 360 and inverter 362 to reset the DONE signal from the output of the flip-flop 364. The $\overline{STOY}$ signal is also fed through OR gate 366 to set the DMAOUT signal at the output of flip-flop 368. The presence of the DMAIN response from another Universal Control Board is sampled by the input multiplexer 352, and if it is in state 1 it causes the output multiplexer 358 and the signal $\overline{ST1Y}$ to be fed through OR gate 370 and inverter 372 to pin K of the flip-flop 368, causing DMAOUT to be reset. The input multiplexer 352 will change state upon a negative response from the other end of the cable of DMAIN going away, indicating that information has been taken off the cables. The change in state of the input multiplexer output 352 may cause the state 2 output, ST2Y, to be generated by the output multiplexer 358 which is fed through the OR gate 374 to set the DONE output on the DONE flip-flop 364. The DONE signal is fed back to the input multiplexer 306 of the ROM sequencer 290 to indicate that the byte successfully moved to the other Universal Control Board. The output multiplexer 358 also has an output signal $\overline{ST3Y}$ fed through OR gate 376 and inverter 378 to reset the counter 354.

The sequence described above for setting and resetting the DONE and DMAOUT signals is basically the same whether the cable timing control circuit 340 is in the slave or master mode. The master mode operation was described above where the DONE flip-flop 364 and DMAOUT flip-flop 368 were set and reset by the signals ST0Y, ST1Y and ST2Y from the output multiplexer 358.

If the cable timing control circuit 340 is to operate in the slave mode, which means it is receiving a byte of data to be transmitted down a cable from another Universal Control Board, the slave signal will be generated from the ROM combination chip 206 to control the counter 354. The slave signal input to the counter 354 causes it to start out in state 4. The $\overline{ST4Y}$ signal is fed through one input of OR gate 360 and inverter 362 to reset the output of the DONE flip-flop 364. Response from the control board on the other end of the cable is the DMAIN signal sampled by the input multiplexer 352 to cause a state 5 output at the output multiplexer 358. The $\overline{ST5Y}$ signal is fed through the OR gate 366 to set the DMAOUT flip-flop 368. The cable timing control circuit 340 then waits for the DMAIN signal to go down which is detected by the input multiplexer 352 causing the state of the output multiplexer 358 to change to state 6. The $\overline{ST6Y}$ signal is fed through OR gate 374 to set the DONE output of flip-flop 364 and also fed through OR gate 370 and inverter 372 to reset the output of DMAOUT flip-flop 368. The output multiplexer 358 slave mode also has the output signal $\overline{ST7Y}$ fed through OR gate 376 and inverter 378 to reset the counter 354.

FIGS. 10n and 10i illustrate the circuit providing the data path for the movement of a piece of data. Multibus data drivers/receivers 400 and 402 are integrated circuit chips which function as translation devices for data flowing between the multibus and the Universal Control Board. The multibus data drivers/receivers are controlled by OR gate 404 having one of its input from the CONNECT signal from the contention logic circuit 460 (FIG. 10k) and an input from the BDSEL (board select) signal from the address decode circuit 490 (FIGS. 10-l). The OR gate 406 also controls the data drivers/receivers 400 and 402 and has its inputs connected to the REN signal and the IOR signal.

The data DB0-DB7 connected internally on the Universal Control Board moves through data bus 408 to command/status register of RAM combination I/O Chip 204 (FIG. 10b) and to the input of holding registers 410 and 412. The STROBE signal from the multibus timing control circuit 540 is fed through inverter 414 to the register 410. The $\overline{INCDMA}$ signal and READ signal are the inputs of NAND gate 416 having its output $\overline{REN}$ to the register 412. The $\overline{REN}$ signal also fed through an inverter 418 has one input to the OR gate 406 of the multibus data drivers/receivers 400 and 402.

Holding register 420 has its input connected to the output of holding register 410 to generate an overlapped transaction. A byte of data loaded into register 410 from the multibus is immediately transferred to the register 420, so that register 410 is ready to read another byte of data from the multibus. The cable timing control circuit 340 is running simultaneously with the multibus timing control circuit 540 to send bytes of data through the cable while the multibus timing control 540 is reading bytes of data from the multibus. Holding registers 410 and 420 create this overlapped transaction when moving data from the multibus memory to the cable. The output of register 420, IB0-IB7, is placed on cable bus 422 to cable bus drivers 424 and 426, which serve as translation devices to take the data from the internal environment of the board and put it on the external environment of the cable. A parity generator 428 takes the eight data bits IB0-IB7 and generates a ninth data bit, IB8, which is an odd parity representation of the rest of the data.

The holding registers 412 and 420 provide an overlapped condition in input, when data is moving from the cable into the multibus memory. Data received by the cable drivers/receivers 424 and 426 is transferred through register 430 to the bus 432 as data bits OR0-OR7 as the input of holding register 420. The data stored in the holding register 420 is immediately moved into the holding register 412, so that register 420 is available to do another transaction simultaneously, moving the first data byte into holding register 412. Thus, holding register 420 switches functions depending on whether the system is in the input or output function in order to provide the overlapped condition.

A parity checking generator 434 takes the eight data bits RD0-RD7 from the cable driver/receivers 424 and 426 to generate a ninth data bit, RD8, which is an odd parity representation of the rest of the data. Generation of the parity bit is stored in flip-flop 436 which generates the signal PARER to the RAM combination chip 202 of the microprocessor circuit.

The holding register 420 is clocked by three different functions through the OR gate 438. One function is the input function when the system is reading from the cable. In this input function, the READ signal and the DMAINSY signal are the inputs to the NAND gate 440, which has its output connected to the input terminal of the OR gate 438. In the output function, the WRITE and G1012 signals are connected to the input terminals of NAND gate 442 which has its output connected to OR gate 438. The third function of the holding register 420 involves single byte transfers on the multibus, transfers which do not involve the cable. The DATACLK signal from the RAM combination chip 202 is fed through one input terminal of the OR gate 438.

A bus address switch 450 is also connected to the IB0 bus 422 to provide a unique address for a Universal Control Board. The microprocessor circuit through its RAM combination chip 202 has an output signal RDSWT connected to the bus address switch 450 to read the preset switches which are the input to the bus address switch 450. This is part of the initialization function of the microprocessor circuit.

The microprocessor circuits of the Universal Control Boards communicate with one another to determine which universal control boards have access to the cable bus and to determine whether they are in the master or slave mode. The DATAIN, IINTR and SDATIN signals from the microprocessor circuit are switched through a control multiplexer 452 to switch the three signals to either the master cable bus driver/receiver 454 or the slave cable bus driver/receiver 456. If microprocessor 200 is in the master mode, the control signals are switched to the master cable bus driver/receiver 454. If the SLAVE signal is received by the control multiplexer 452, the microprocessor 200 is in the slave mode and the control signals are directed to the slave cable bus driver/receiver 456.

In the master mode, the driver/receiver 454 is driving the interrupt line, $\overline{\text{INTR}}$, and the request lines, $\overline{\text{DMA-REQ}}$ and $\overline{\text{DATAREQ}}$. In the master mode, the slave cable bus driver/receiver is receiving the attention, $\overline{\text{ATTEN}}$, signal as well as the response signals, $\overline{\text{DMA-RESP}}$ and $\overline{\text{DATARESP}}$. In the Universal Control Board in the slave mode, just the reverse happens. The master driver/receiver 454 is receiving the interrupt signal, $\overline{\text{INTR}}$, and the request signals, $\overline{\text{DATAREQ}}$ and $\overline{\text{DMAREQ}}$. The slave driver/receiver is driving the attention signal, $\overline{\text{ATTEN}}$ and the response signals, $\overline{\text{DMARESP}}$ and $\overline{\text{DATARESP}}$.

As shown in FIG. 10k, access to the multibus is controlled by the contention logic circuit 460. The contention logic circuit 460 is controlled by three signals, $\overline{\text{BUSY}}$ and $\overline{\text{BPRN}}$ from the multibus and BUSREQ from the ROM sequencer 290. The $\overline{\text{BUSY}}$ signal is an indication that the multibus is busy with a transaction in progress. The $\overline{\text{BPRN}}$ signal is an indication whether or not the Universal Control Board has priority. The BUSREQ signal is generated by the ROM sequencer 290 when it is doing either single or block mode transfers. The $\overline{\text{OVERRIDE}}$ signal is from an input/output port of the ROM input/output port chip 206. A bus request flip-flop 462 may be set by either the BUSREQ signal or the $\overline{\text{OVERRIDE}}$ signal. The BUSREQ signal is fed through an inverter 464 to one input of an OR gate 468 having its second input terminal tied to the $\overline{\text{OVERRIDE}}$ signal. The output of OR gate 468, SBREQ, sets the bus request flip-flop 462. The BREQ signal from the output of flip-flop 462 is fed through inverter 470 to appear as the signal $\overline{\text{BREQ}}$ which goes on the multibus to some external logic which will arbitrate bus priority. This external controller determines priority and upon receipt of priority for the requesting universal control board the $\overline{\text{BPRN}}$ signal is received by the control board fed through inverter 472 to one input terminal of NAND gate 474. The BREQ signal is fed back through the output of the bus request flip-flop 462 to another input gate of the NAND gate 474. When the multibus is no longer busy, the $\overline{\text{BUSY}}$ signal is fed through an inverter 476 and inverter 478 to the third input terminal of NAND gate 474. The output of NAND gate 474 is the output signal $\overline{\text{SCON}}$ fed through an inverter 480 to set the connect flip-flop 482. The output connect signal is fed back through inverter 484 to generate the BUSY signal. The only way to reset the connect flip-flop 462 is for the bus request signal to be reset. A $\overline{\text{BUSCLK}}$ signal is received from the multibus and fed through an inverter 486 as the bus clock signal to the bus request flip-flop 462 and the connect flip-flop 482.

As shown in FIG. 10-l, an address decode circuit 490 functions to decode the addresses AA0–AA7 from address drivers 262 and 264. Address signals AA4–AA7 are fed through address decoders 492 and 494 to generate output signal $\overline{\text{BDSEL}}$, the board select signal. The other four signals AA3–AA0 are fed through address decoder 496 to select one of three functions on the board. The input/output reset function, the $\overline{\text{IORST}}$ signal, is fed through an inverter 498 and one input terminal of NAND gate 500. The other input of NAND gate 500 is from the IOW signal from the multibus timing control circuit 540. The input/output reset function indicates that some other controller on the bus desires this universal control board to be reset, and the IORST signal is fed to the reset circuitry 210 described hereinabove.

Figure 10M:
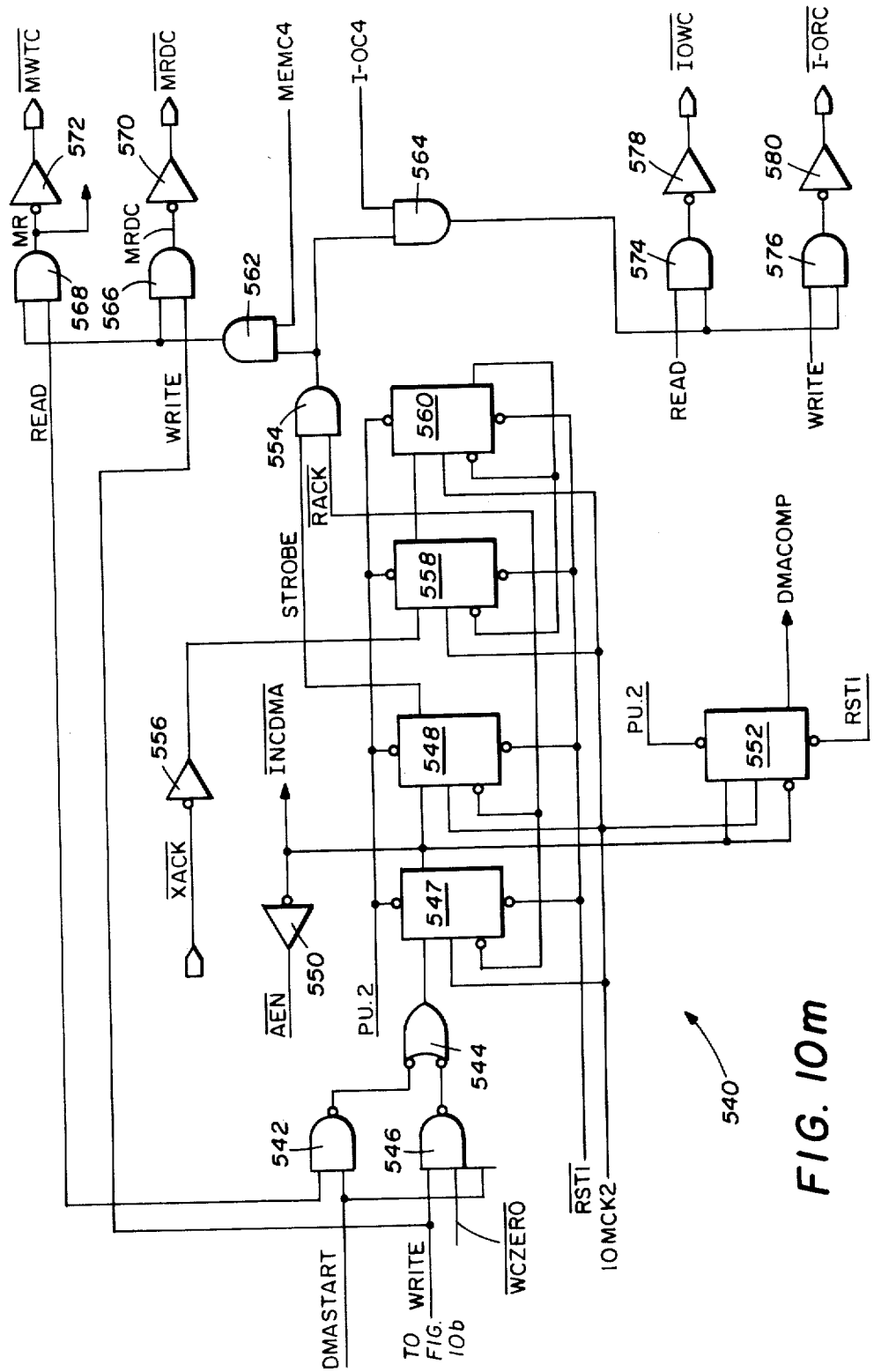

The remaining two functions decoded by the address decode 496 are used to communicate with one of the input/output ports of the RAM input/output combination chip 204. The integrated combination chip 204 can be configured through software to function as either a status register on a command register. The command register function is fed from the address decode 496 through an inverter 502 to one input terminal of NAND gate 504. The second input terminal of NAND gate 504 is controlled by the IOW signal. The output of NAND gate 504 is the $\overline{\text{CMDW}}$ signal to port A of the RAM combination I/O chip 204. The output from the inverter 502 is also fed to one input of NAND gate 506 having its other input connected to the IOR signal from the multibus timing control circuit 540 (FIG. 10m). The output of NAND gate 506 is the signal $\overline{\text{STATR}}$ which goes to port B of the RAM combination I/O chip 204.

The command register functions to allow some other control board to load data into the register so that it can be read and responded to by the microprocessor circuit. The status register functions to allow the microprocessor circuit to store information here and some other Universal Control Board can read that information through the bus and the address decode circuit.

A third function of the address decode 496 is an output fed through both input terminals of the NAND gate 508 which has its output applied as one input to NAND gate 510. The outputs of NAND gates 506 and 510 are fed to the inputs of OR gate 512 which has its output connected to the input of NAND gate 514 which has its output connected to the data bus interface device 516.

Reviewing the three commands implemented through the address decode device 496, the output of NAND gate 504 loads a byte of data into the command register of the RAM combination I/O chip 204. The output of NAND gate 506 creates and simultaneously resets the status register of the RAM I/O chip 204, while the output of NAND gate 510 reads the status register of chip 204 without resetting it. The output of the status and command registers, DB0–DB7, is placed on the DB data bus 408 (FIG. 10h).

A multibus slave timing circuit 520 receives the strobes $\overline{\text{IOWC}}$ and $\overline{\text{IOWRC}}$ from the output of the multibus timing control circuit 540. The IOWC signal is fed through inverters 522 and 524 to form one input OR gate 526. The $\overline{\text{IORC}}$ signal is fed through inverters 528 and 530 to the other input of OR gate 526. The output of OR gate 526 is input to shift register 532 to generate an output XACK fed through an inverter 534 to be conditioned as the signal $\overline{\text{XACK}}$. The $\overline{\text{XACK}}$ signal is an acknowledgement to the multibus that read and write strobes have been detected and the board select address has been detected. The board select signal is fed through an inverter 536 to the shift register 532. Shift register 532 also has a clock signal, CCLK, fed through an inverter 538.

FIG. 10m illustrates the multibus timing control circuit 540. A NAND gate 542 has its input connected to the READ signal and the DMA START signal from the ROM sequencer 290. The output of the NAND gate 542 is connected to one input terminal of the OR gate 544. The second input terminal of the OR gate 544 is connected to the output terminal of AND gate 546, having its input terminals connected to the WRITE signal, the $\overline{\text{WCZERO}}$ signal and the DMA START signal from the ROM sequencer 290.

The output of the OR gate 544 sets flip-flop 547. The output of flip-flop 547 is the origin of the INCDMA signal and it is also fed through an inverter 550 for the $\overline{\text{AEN}}$ signal. The output of the flip-flop 546 also controls the input of the flip-flop 552 for setting the DMA-COMP signal to be fed to the ROM sequencer 290. The output of the flip-flop 548 is used to set one input of AND gate 554.

The $\overline{\text{XACK}}$ signal from the multibus slave timing circuit 520 is fed through an inverter 556 to set the flip-flop 558. One output terminal of the flip-flop 558 is connected to a second flip-flop 560 having its output fed back to the $\overline{\text{K}}$ terminals of the flip-flops 558 and 560. The second output terminal of the flip-flop 558 is identified as the $\overline{\text{RACK}}$ signal connected to the second input terminal of the AND gate 554.

The output of the AND gate 554 is connected to one input terminal of AND gate 562 and AND gate 564. The second input terminal of the AND gate 562 is the MEMCY signal from the ROM combination I/O chip 202. The output of AND gate 562 is connected to input terminals of AND gate 566 and 568. One input terminal of AND gate 566 is the WRITE signal from the ROM combination I/O chip 206, and the second input terminal of AND gate 568 is the READ signal also from the ROM combination I/O chip 206. The output of AND gate 566 is fed through an inverter 570 and identified as the $\overline{\text{MRDC}}$ signal, and the output of the AND gate 568 is fed through inverter 572 identified as the output signal $\overline{\text{MWTC}}$.

The AND gate 564, having one input terminal connected to the output of AND gate 554, has a second input terminal connected to the IOCY signal from the RAM combination I/O chip 202. The output of AND gate 564 is fed to input terminals of AND gates 574 and 576. The second input terminal of the AND gate 574 is the READ signal, and the second input terminal of the AND gate 576 is the WRITE signal. The output of AND gate 574 is fed through an inverter 578 and is the $\overline{\text{IOWC}}$ signal used as an input to the multibus slave timing circuit 520. The output of the AND gate 576 is fed through an inverter 580 which has as its output the $\overline{\text{IORC}}$ signal used as another input to the multibus slave timing circuit 520.

The VMS 10 utilizes several microprocessor controlled universal control boards connected to one multibus instead of a single minicomputer. The Intel multibus is the main bus which connects all the microprocessors together. The Universal Control Board has two distinct capabilities for moving data around in the VMS 10. First, the microprocessor 200 of the Universal Control Board may transfer data in single bytes in and out of the multibus memory at a relatively slow rate to communicate with other microprocessors 200. Secondly, the Universal Control Board may also control the transfer of data in block form at a very high rate of speed through the cable or data bus interconnecting the Universal Control Boards. The ROM sequencer 290 has the function of coordinating the timing of the transfer of information from one cable to another cable with the microprocessor 200 instruction transfers to or from the multibus.

The VMS 10 is an advanced communication system for audio signals, including facsimile, data, cryptographic and voice signals. The VMS 10 implemented in the preferred embodiment is described above in connection with voice signals, but the concept of the communication system has application for other audio signals as well. The VMS 10 of the preferred embodiment allows users to deposit voice messages which are recorded and later delivered to the intended recipients. In addition, users may call the VMS 10 at any time and inquire if any messages have been deposited for them. The VMS 10 may also answer a telephone while the user is absent or otherwise unavailable to receive the call and record a voice message for subsequent delivery to the user.

While the VMS 10 is intended primarily for use within medium to large corporations, it may be effectively used to improve the operator efficiency of any communication system. It offers an improved method of communications and at the same time it provides an excellent return on invested capital, achieved through increased personnel productivity at all levels within the company, as well as through personnel reduction and elimination of many existing, costly communication facilities. The VMS 10 also provides a number of usage reports to monitor the operation of the system.

The three basic features of the VMS 10, DEPOSIT, DELIVERY and INQUIRY, have been simplified to provide an easy to use system. The VMS 10 includes instructional messages, "canned" messages ("Voice Message System", "VMS", and "Voice-messages" are trademarks of applicant, Electronic Communication, Systems, Inc.) Each of the three basic features of the VMS 10 will be described below.

FIGS. 11 to 14 represent the flow chart for the DEPOSIT feature of the VMS 10. "DEPOSIT" is the procedure by which one or more voice messages are placed into the VMS 10 for subsequent delivery. Referring to FIG. 10, the DEPOSIT procedure is initiated by dialing into the VMS 10 to access the system 600, causing the VMS 10 to answer 602 by playing a canned message, such as "This is VMS."

A timer is started when the VMS 10 answers a call and identifies itself at step 602. The user then must complete the entire DEPOSIT process within a preset time interval (for example, 4 minutes). Approximately 30 seconds before this interval expires the VMS 10 will begin signaling the user with an alarm, such as a "beep" every 3 seconds. If the user has not completed the DEPOSIT operation by the end of the time interval, the VMS 10 will abort the DEPOSIT operation and terminate the user's access to the system.

After the VMS 10 answers 602, the user then dials a unique authorization number 604 for identification purposes to gain access to the system. The VMS 10 will allow the user a preset amount of time to dial a signed authorization number, e.g., 45 seconds. Upon entry of a valid authorization number, the VMS 10 responds with a short progress tone indicating it is ready to process an addressee 606. When all addresses have been entered, the user dials an End-of-Address indicator, e.g., "0," and VMS 10 will provide a record-mode "idle" tone, such as a repeating "beep-beep . . . " signal. The next step in the DEPOSIT routine 608 determines if the end of record indicator has been entered. If it has not, he returns to step 606 for the entry of an addressee number. If it has determined that a "0" was dialed, the user dials "1," removing the VMS 10 idle tone which enables this to record a voice message 610. At the conclusion of the recording step 610, the user may elect to either DEPOSIT another message 612, inquire for messages 614 or hang up 616.

In the system's step 606 in processing an addressee, the user may dial one or more addresses to which the voice messages are to be sent. "Addressees" are generally no more than telephone numbers, local extension numbers, distant company locations, or "off net" long distance numbers. A system parameter may be entered from the console to set the maximum number of individual addresses which may be entered. In addition, a distribution list code may be used as an address. This is a three digit address which is automatically translated by the VMS 10 into the previously defined individual telephone numbers of the group. The user of the VMS 10 in this way may send a single voice message to a number of people by using a single address, analogous to using a distribution list for a memo or letter. The VMS 10 will then deliver the voice message independently to each person within the group.

The VMS 10's step 604 for processing a user ID is set forth in detail in FIG. 12. The procedure is initiated by the user dialing the identification code digits 618. The user may dial an "*" 620, if he discovers a dialing error before dialing the last digit. The VMS responds with a single "beep-beep" tone 622 to acknowledge that the user is allowed to redial the identification code. The VMS 10 next validates the identification code of the user 624. In determining the validity of the code 626, the VMS 10 acknowledges if a valid code has been entered 628 with an audible signal, such as a single "beep." This completes the user-ID processing 604 to allow the user to proceed to process an addressee 606 (FIG. 11). However, if the user identification code has been determined to be invalid, the VMS 10 determines if this is the first or second invalid entry 630. If it was the first attempt to enter a valid user code, the VMS 10 plays a canned message 632, such as: "The ID (__) is not valid. Please try again." The program then returns the user to program step 618 for redialing of the identification code. If the second try for the validity test 630 determines that this is the second entry of an invalid code, the VMS 10 plays a canned message and hangs up 634. The canned message at step 634 would be: "The ID you entered is again not valid. Please dial (__) for information or assistance. Thank you." There is an alternative to the progress tone provided at program step 628 to the VMS 10's acknowledgement of a valid ID code. A canned message may instruct the user as follows: "To deposit a message, you may now dial the addressees. For any other function dial the 3 digit special function code." The user may access the VMS 10 through a special code to provide for verbal instructional commands in lieu of progress tones.

Figures 13, 14:
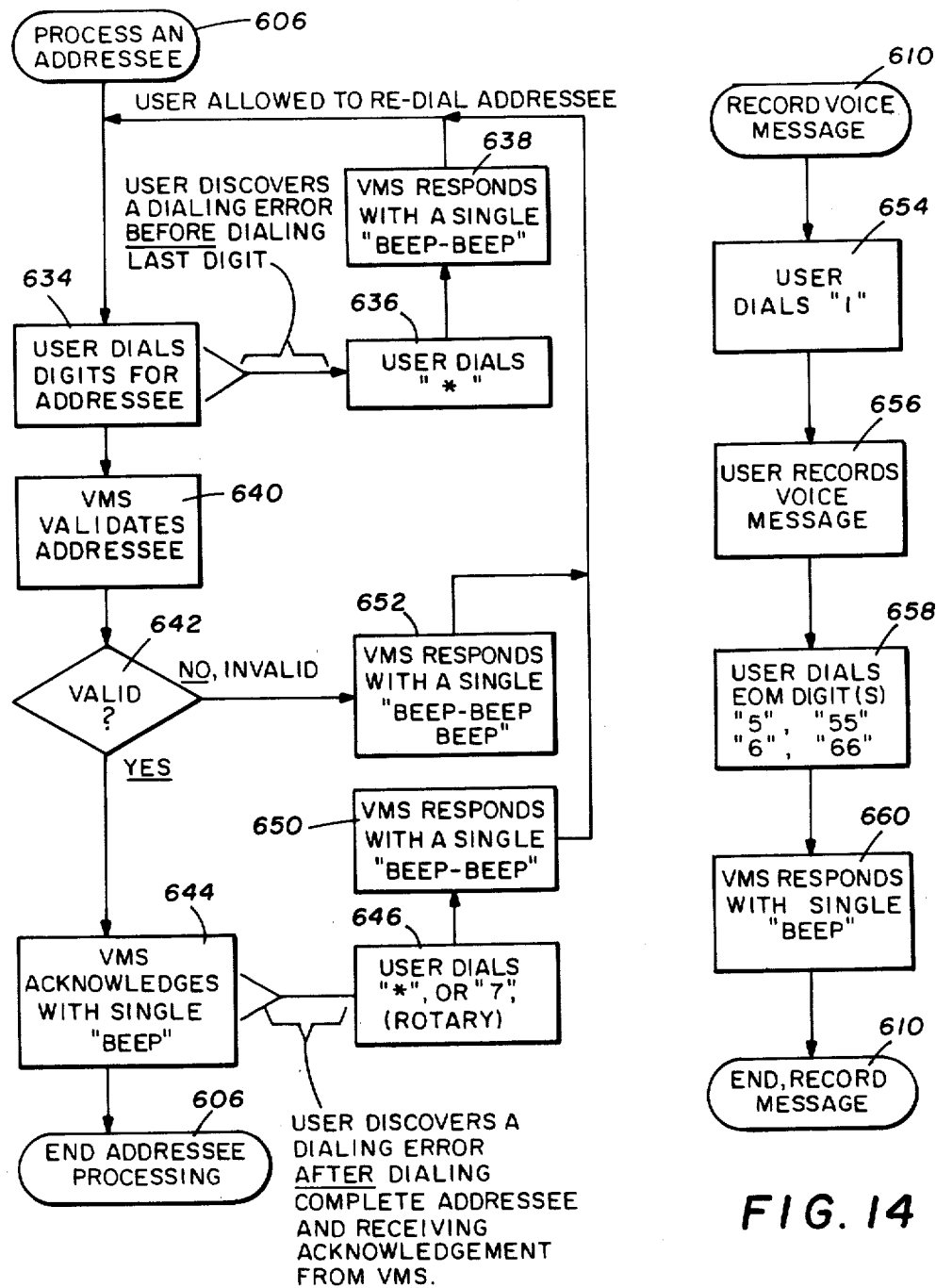
FIG. 13 is a flow chart of the process an addressee subroutine of the message deposit function of the voice message system.
FIG. 14 is a flow chart of the record voice message subroutine of the message deposit function of the voice message system.

FIG. 13 is a flow chart of the process and addressee program step 606 of FIG. 11. In the first program step 634, the user dials digits for an addressee. If the user discovers a dialing error before dialing the last digit he may branch to program step 636 by dialing a "*" to delet the addressee number. The VMS 10 responds with an audible signal, 638 "beep-beep," and allows the user to redial the addressee. Upon the user's entry of the digits for an addressee, the program provides for the VMS 10 to validate the addressee 640. The program step 642 determines the validity of the addressee. If a proper addressee code has been entered, the VMS acknowledges with an audible signal 644, "beep." If the user discovers a dialing error after dialing a complete addressee and receiving acknowledgement from the VMS 10, he may branch to program 646 by dialing "*" on a touch signaling phone or "7" on a rotary phone. The VMS 10 program next responds with an audible signal 650, "beep-beep" and allows the user to reenter at program step 634 to dial the digits for the addressee. If at the validity determination step 642, the VMS 10 determines that an invalid addressee number has been entered, the program branches to step 652 and responds with an audible signal, "beep-beep-beep," and allows the user to redial the addressee.

Referring to FIG. 14, the record voice message block 610 of FIG. 11 is shown in greater detail. The VMS 10 emits a repetitive audible tone as an idle tone prior to the recording of any message. The user dials "1" in block 654 to remove the idle tone from the VMS 10 and to allow the user to record a voice message 656. During the speaking of the voice message, the following dial commands are available to control the recording procedure:

| DIAL COMMAND | VMS ACTION |
|---|---|
| 1 | Start recording. |
| 1 | Stop recording and return the record mode idle tone. |
| 3 | Back up (approximately 10 seconds) and start playing. |
| 4 | Back up to the beginning of the voice message and start playing. |
| 9 | Skip forward (approximately 10 seconds) and play. |
| 99 | Skip forward to end of recorded data and return to the record mode idle tone. |

Following the end of the voice message step 656, the user next dials an End-of-Message indicator (EOM) at step 658 by dialing "5" for normal message delivery and "6" for priority delivery. The EOM can also be used to activate the nondelivery notification (NDN) feature. This feature allows the voice message originator to be notified automatically if the message is not delivered to the intended recipient the next business day. If this happens, the voice message is automatically readdressed to the originator, and the following "canned message" appended to its beginning: "This is VMS, the following message was not delivered (the voice message follows)." NDN is activated by dialing the EOM twice ("55"), or ("66"). Upon the user's dialing the EOM digits in step 658, the VMS 10 responds with a "beep" at program step 660. At the end of record voice message program step 610 the user has the three program options, as illustrated in FIG. 11 and described hereinabove.

The DEPOSIT function of the VMS 10 further provides for discarding the voice message if the user hangs up prior to EOM. The VMS 10 DEPOSIT program also provides for three different types of time periods which are predefined for the customer at the time of system generation. These predefined time periods may be subsequently changed from the system operator's console 104 of FIG. 6. The first of the three time periods the VMS 10 uses to monitor the message DEPOSIT process is an overall call duration timer. About 30 seconds prior to the elapse of the message DEPOSIT time interval, the VMS 10 will signal the user with an alarm, such as an audible tone generated every 3 seconds. If the user does not complete his message DEPOSIT operation within the remaining time, the VMS 10 will abort and hang up. There is a second short duration time period that VMS activates while waiting for the user to dial a "parameter" such as the user ID step 604, a single addressee in step 634, or dialing "0" to signal the end of addressees in step 608. Finally, a third predefined time period is used by the VMS 10 to monitor the time that the user is in the record mode idle state prior to the user dialing "1" in step 654. This record mode idle state is entered after dialing the "0" for the end of addressees code in step 608.

The DEPOSIT function also includes program means for negating one or more numbers in a distribution code. For example, if a particular distribution code equated to fifty individual telephone numbers, one of these numbers that the originator did not wish to send a message to could be deleted for the entry of a suitable program code. After the entry the distribution code will have the effect of negating that address from a list of numbers on the distribution code to receive that voice message.

In addition, the DEPOSIT function of the VMS 10 is also programmed to allow a user to call the VMS 10 by a Special Function Code to turn on or off the Enhanced Verbal Commands and Reply (EVCR). The user's selection of the EVCR mode causes the VMS 10 to play prerecorded instructional messages in place of progress or error tones, e.g., tones which might relate to incorrect user ID's and addresses.

Figures 15, 17:
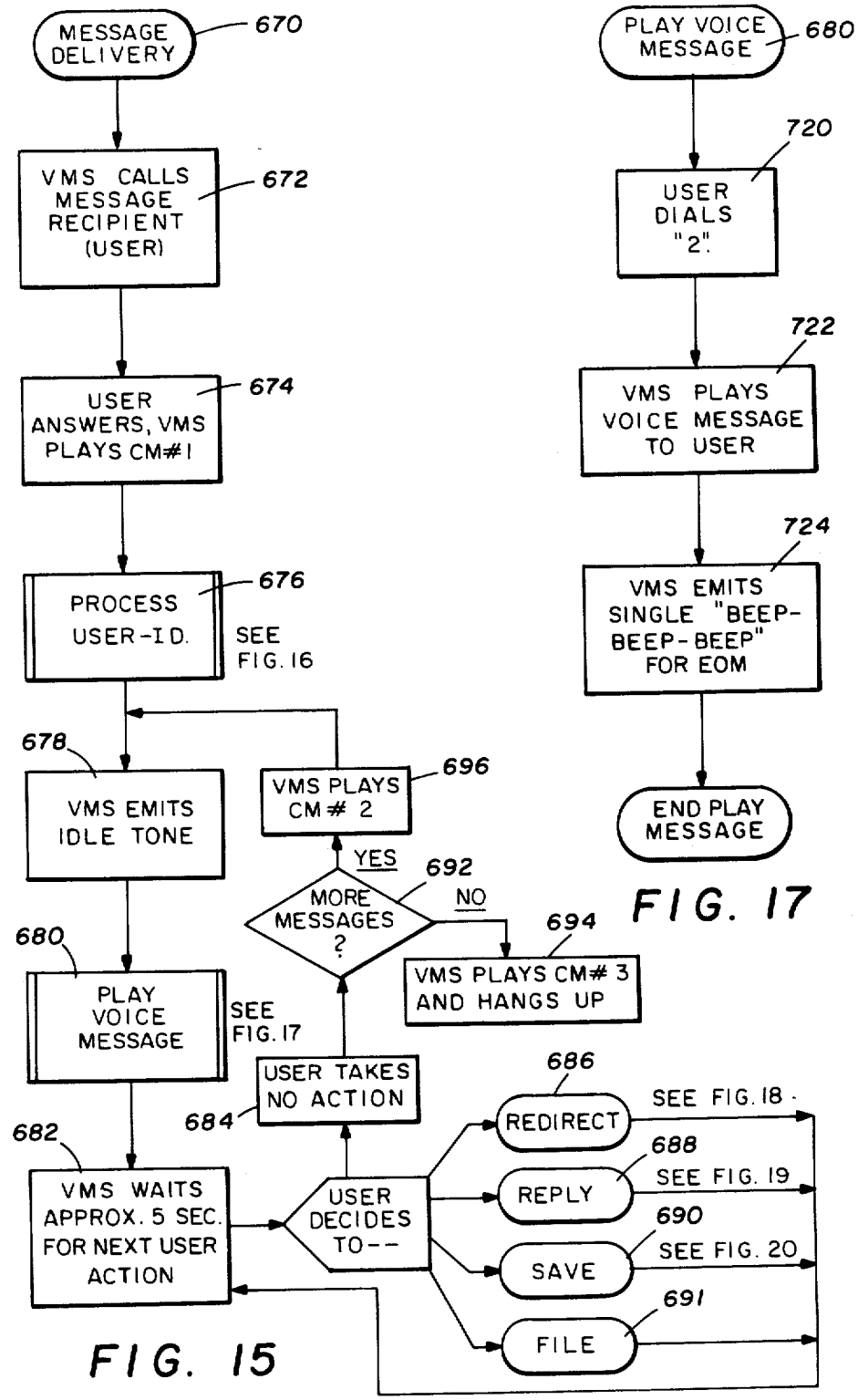
FIG. 15 is a flow chart of the message delivery function of the voice message system.
FIG. 17 is a flow chart of the play voice message subroutine of the message delivery function of the voice message system.

"DELIVERY" is the second of the three system features of the VMS 10, which enables voice messages to be played to their recipients. FIG. 15 illustrates a flowchart of the program of the VMS 10 for the message DELIVERY function 670. In initial step 672 of the program the VMS 10 calls the message recipient by dialing the telephone of the recipient. In the next step 674, the user answers and the VMS 10 may identify itself by playing canned message as follows: "This is VMS. There are __ messages for you. Please dial your authorization number if you wish to receive them. Thank you." If the message addressee had not answered the initial telephone call from the VMS 10, the VMS 10 is programmed to wait and attempt to redeliver the message at a later time. Likewise, if the message addressee's telephone had been busy, the VMS 10 would again be programmed to attempt to deliver the message a predetermined number of times at predetermined time intervals. The number of attempts and time intervals between each of the attempts by the VMS 10 to deliver the message are programmed parameters that are definable by the customer through the system console 104 of the VMS 10.

When the VMS 10 establishes contact with the message addressee, the message addressee responds by dialing his unique authorization number and the VMS 10 processes the user's ID at step 676. After the process user ID has been accepted at program step 676, the VMS 10 emits an idle tone at program step 678, indicating the non-play mode. The user or message addressee then dials "2" to begin playing the voice message program 680.

During the playing of a voice message, the following dial commands are available to the message addressee to control the VMS 10 message delivery 670:

| DIAL COMMAND | VMS ACTION |
| --- | --- |
| 2 | Start playing. |
| 2 | Stop playing, followed by non-playing indicator, a periodic "beep." |
| 3 | Back up and play approximately the last 10 seconds. |
| 4 | Back up to the beginning of the voice message and start playing. |
| 9 | Skip forward approximately 10 seconds and play. |
| 99 | Skip forward to end of message. |

At the conclusion of the voice message, the VMS 10 is programmed to play some audible tone, such as three short "beeps" indicating the end of message, or an EOM canned message if EVCR is turned on. The VMS 10 is then programmed to wait approximately 5 seconds for the next user action 682. The message addressee then has the option of taking no action 684 or initiating some action with the VMS 10 through one of the special function codes redirect 686, reply 688, save 690 and file 691.

If the user decides to take no action 684, the VMS 10 is programmed to determine whether there are more messages 692. If there are no more messages, the VMS is programmed to play a canned message and hang up 694. Thus a suitable canned message could state: "This is VMS. This concludes your voice message delivery. Thank you." If the VMS 10 determines that there are more messages for the addressee 692 the VMS 10 indicates such message to addressee at program step 696 by playing a suitable canned message, such as: "This is VMS. Here is another message for you." The program is then returned to step 678 for the VMS 10 to admit an idle tone prior to playing a voice message step 680.

The message addressee can enter the VMS 10 through one of the special function codes redirect 686, reply 688, save 690, and file 691. These program steps are described below.

Figure 21:
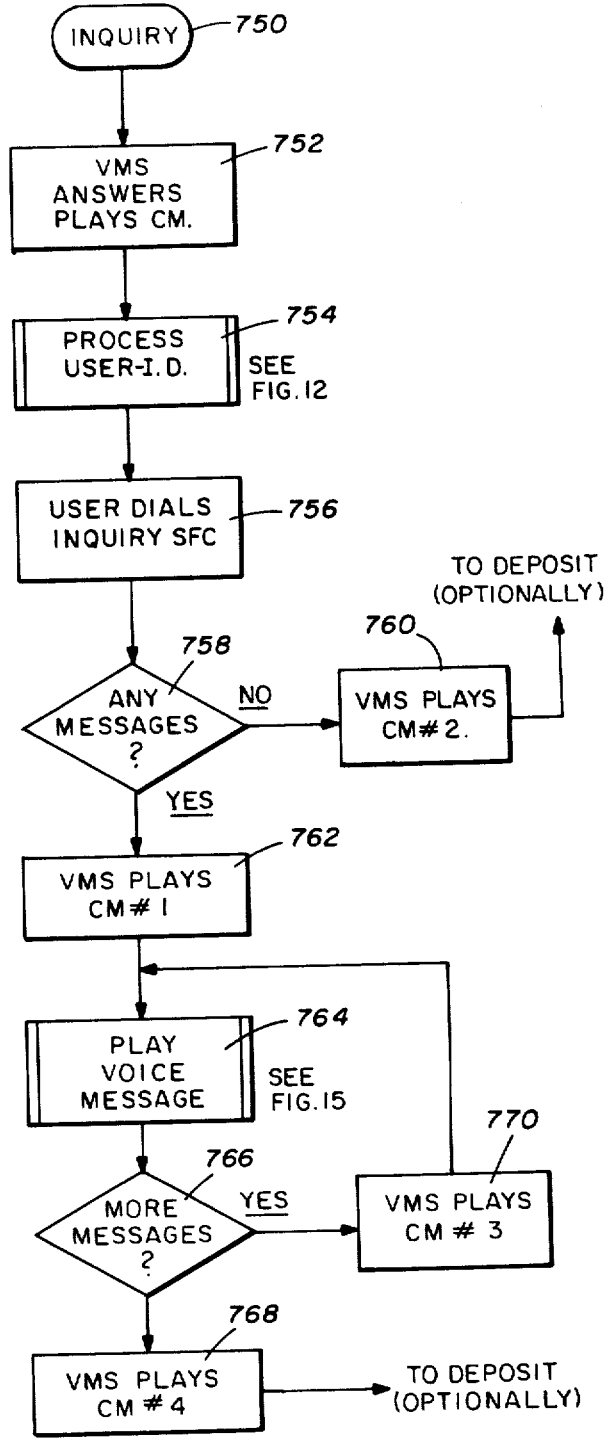
FIG. 21 is a flow chart of the inquiry function of the voice message system.

The VMS 10 is ordinarily programmed if a message addressee hangs up during the playing of a voice message. That message and all other undelivered messages will be delivered at a later time or could be available to the message addressee through the INQUIRY function (FIG. 21).

Figure 16:
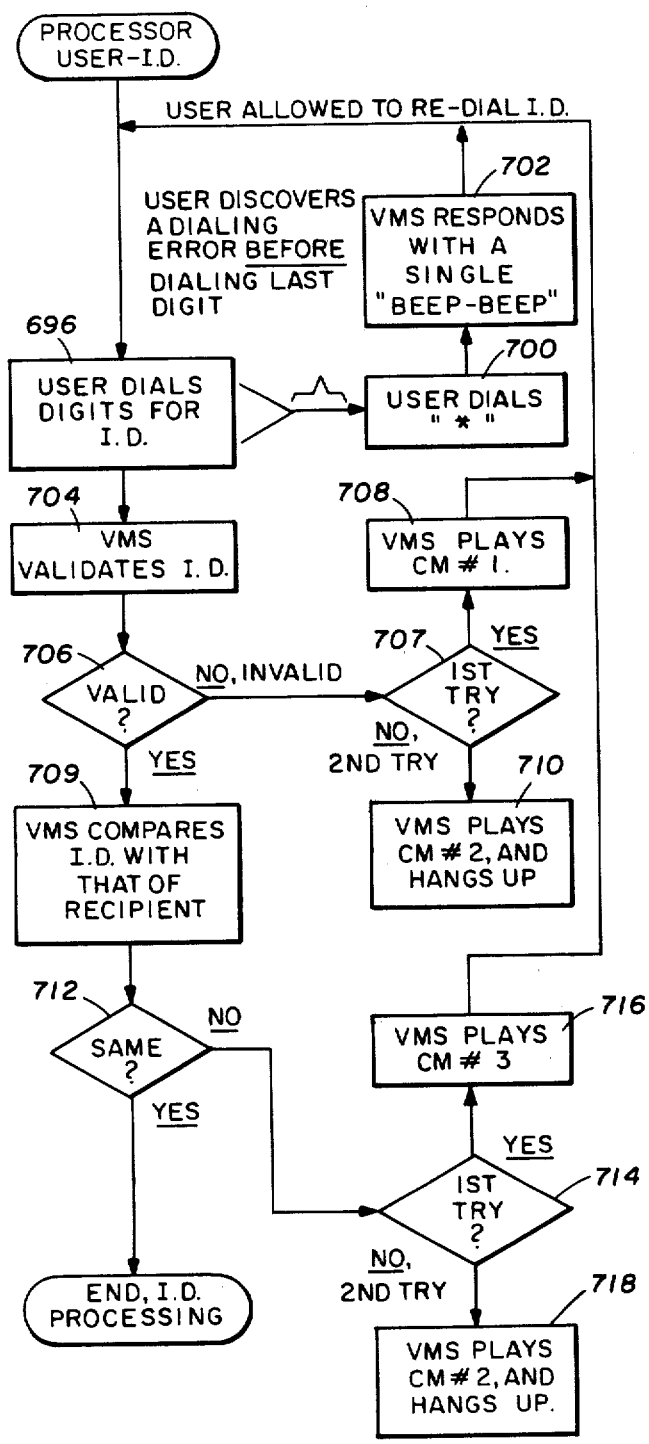
FIG. 16 is a flow chart of the process user I.D. subroutine of the message delivery function of the voice message system.

The VMS 10 program routine for the process user ID step 670 is illustrated further in the flowchart presented in FIG. 16. The user first dials digits for its identification code step 696. The system enables a user to dial "*" in step 700 if he discovers a dialing error before dialing the last digit. If the user dials "*" 700, the VMS 10 responds with an audible tone, "beep-beep" at step 702 and returns the user to step 696 for reentry of the authorization code. After the user has entered his authorization code, the VMS 10 validates the ID at program step 704. The VMS 10 determines the validity of the ID at step 706, and if it determines that the user has entered an invalid ID then it determines at step 707 whether this is the first or second attempt to enter a valid ID. If it is the first attempt, the VMS 10 plays a suitable canned message at step 708 and returns the user to program step 696 for reentry of the authorization code. A suitable canned message would be the following: "The ID (__) is not valid. Please try again." If the VMS 10 determines at step 707 that this is the second attempt to enter a valid ID the VMS 10 proceeds to play another canned message step 710 and hangs up. A suitable canned message upon the detection of the second entry of an invalid user ID would be the following: "The ID you entered is not the correct one for the message recipient. Please try again."

The VMS 10 at program step 706 determines that a valid user ID has been entered. The VMS 10 next compares the ID with that of the recipient at step 709. This concludes the process user ID processing of program 676 of flowchart of FIG. 15. If the VMS 10 at step 712 determines that the ID is not the same as that of the recipient, then program step 714 determines whether this is the first or second attempt to determine if it is the recipient's identification code. If it is the first attempt, the VMS 10 at step 716 plays a suitable canned message and returns the user to program step 696 for reentry of the user identification code. A suitable canned message at program step 716 could be the following: "The ID you entered is not the correct one for the message recipient. Please try again." If the VMS 10 determines that this is the second unsuccessful attempt in comparing the recipient's ID, the VMS 10 at program step 718 plays a suitable canned message and hangs up. The VMS 10 at program step 718 will play the same canned message included in program step 710.

FIG. 17 illustrates the play voice message subroutine 680 of the message delivery program 670 of FIG. 15. The play voice messsage subroutine 680 begins with the user dialing "2" in step 720 to remove the VMS 10 idle tone and initiate the playing of the voice message. The VMS 10 plays the voice message to the user at step 722, during which time the user can control the playback process by dialing certain digits on his telephone, as described above.

At the conclusion of the voice meassage, the VMS 10 emits an audible tone at step 724 to indicate end of message. The VMS 10 is returned to program step 682 of FIG. 15.

Figure 18:
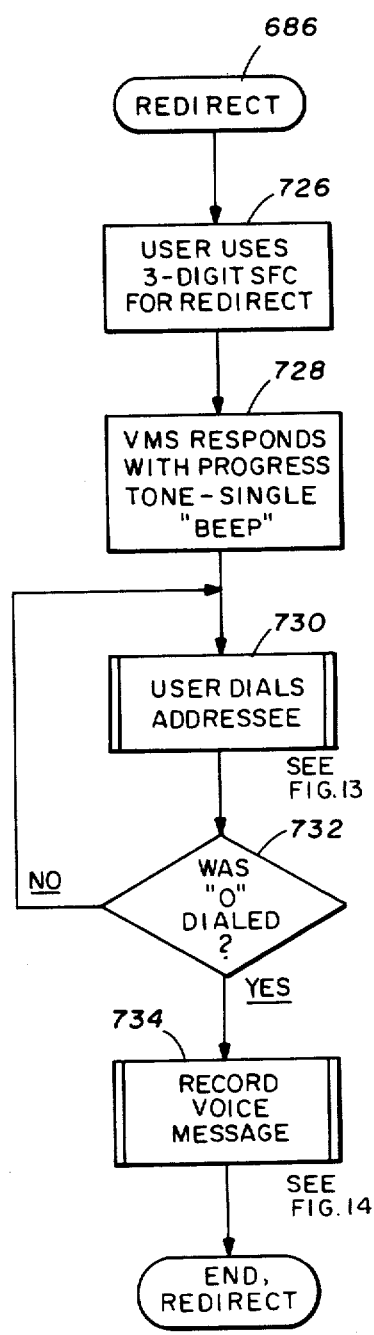
FIG. 18 is a flow chart of the redirect special function code subroutine of the message delivery function of the voice message system.
Figure 19:
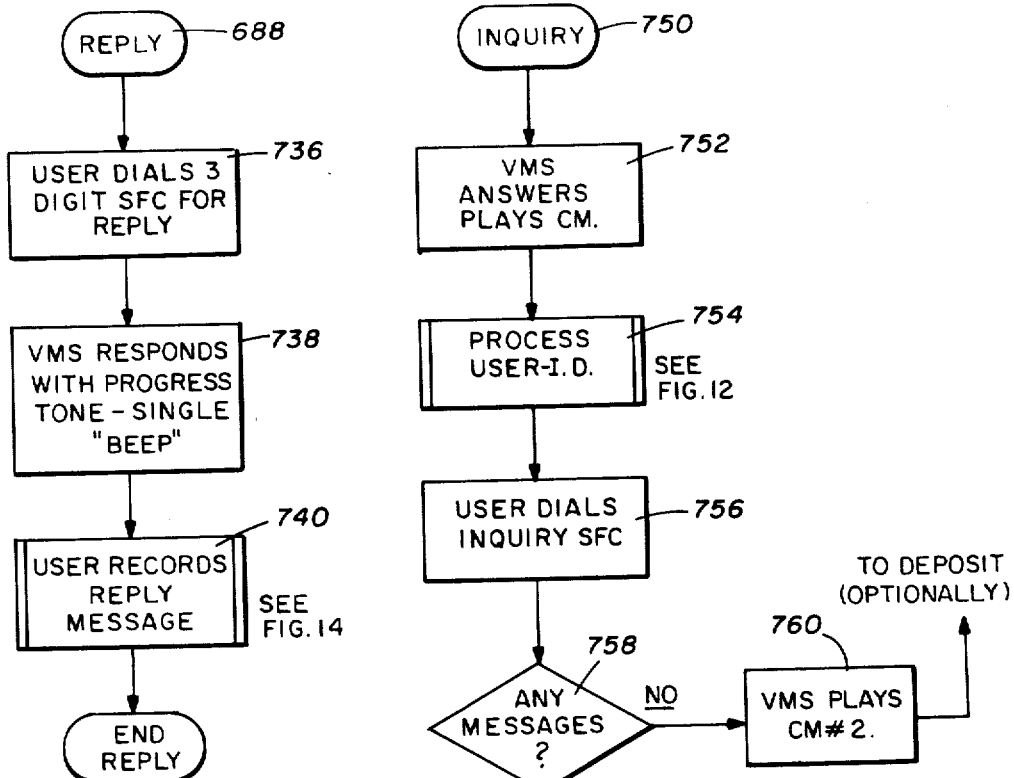
FIG. 19 is a flow chart of the reply special function code of the message delivery function of the voice message system.

As described above, the VMS 10 waits approximately five seconds for the next user action 682 which enables the user to enter certain special function codes if he so chooses to access the VMS 10. The REDIRECT special function code (SFC) subroutine program 686 is illustrated in FIG. 18. The user enters a three digit SFC at redirect program step 726. The VMS 10 responds with a progress tone at step 728, such as a "beep." The user then dials the addressee at program step 730, and the program proceeds through a subroutine as illustrated in FIG. 13 of the message deposit flowchart. The program then determines at step 732 if a "0" was dialed at end of addressee number. If it was not entered, the user is returned to program step 730 for dialing an addressee. If the user has dialed a "0" he may record a voice message at program step 734, which voice message is appended to the beginning of the original voice message and delivered to the newly designated addressees. The original voice message with recipient's comments then will be sent to the new addressees. The program step 734 follows the subroutine of the message deposit flowchart of FIG. 14. The user is then returned to the VMS 10 program step 682 of FIG. 15, which allows the user the opportunity again to select another special function code.

Figure 20:
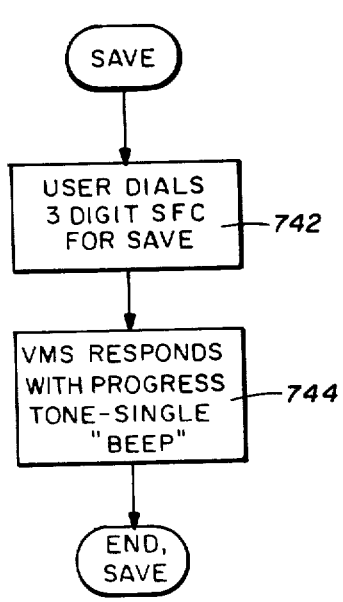
FIG. 20 is a flow chart of the save special function code subroutine of the message delivery function of the voice message system.

The REPLY special function code (SFC) flowchart 688 is illustrated in FIG. 20. The message addressee which desires to reply to the voice message immediately may enter a special three digit SFC at program step 736. The VMS 10 responds with a progress tone at program step 738, which enables the user to record reply message at program step 740, which follows the flowchart subroutine of the message DEPOSIT flowchart of FIG. 14. The REPLY SFC feature enables the user to have a voice message delivered to the voice message originator without having to call the VMS 10 to enter an authorization number and the address of the originator. After the replay message has been entered, the VMS 10 returns to its normal procedures at program step 682 of FIG. 15 starting with playing the end of message indicator.

Following the program step 682, the user may also elect to enter the file special function code 691 for the verbal file folder. This is accomplished by dialing the code for the verbal file folder plus the verbal file folder number (0 through 99). A copy of that message will then be retained in one of the 99 verbal folder categories along with all other voice messages in that verbal file folder for later retrieval.

FIG. 20 illustrates the SAVE SFC program flowchart of the message delivery function 670 of FIG. 15. At the conclusion of the end of message indicator program step 682, the user may decide to save a voice message for later retrieval. The user may accomplish this by dialing the SAVE special function code which causes the voice message to be saved for a predetermined period one complete business day. The user simply dials the three digit special function code for the SAVE program step 742, and the VMS 10 responds with a progress tone at program step 744. The VMS 10 is programmed such that undelivered messages which did not have nondelivery notification (NDN) will be discarded at the midnight following their retention for one full business day. The appropriate summary report will be created by the VMS 10 for each message so discarded, showing the originator ID, input time and date and delivery time and date.

FIG. 21 illustrates the INQUIRY function 750 which enables the user to call the VMS 10 to determine if there are any messages for him. If there are no messages, the VMS 10 so notifies the user. If there are messages, they are delivered immediately.

The INQUIRY function 750 begins with the user dialing the VMS 10, and the VMS 10 program responds at step 752 with an acknowledgement in the form of a short progress tone or a canned message. The user then enters an identification code at step 754 to be processed in the manner previously set forth in the message DEPOSIT flowchart of FIG. 12. The user next dials the INQUIRY special function code at step 756, and the VMS 10 makes the determination at program step 758 if there are any messages for the user. If there are none, the VMS 10 plays an appropriate canned message at program step 760 and gives the user the option to deposit a message. If the program step 758 determines that there are any messages, the VMS 10 plays an appropriate canned message at program step 762, which might include an instruction advising the user to dial a particular digit if he wishes to receive the messages. The VMS 10 will then play the voice message at program step 764 in the same manner previously set forth in the message DELIVERY flowchart of FIG. 15. At the end of message indicator, the VMS 10 will determine at program step 766 if there are any more messages for the addressee. If there are none, the VMS 10 plays an appropriate canned message at program step 768, allowing the user the option to deposit any messages with the VMS 10. If there are more messages, the VMS plays an appropriate canned message at program step 770 and returns the user to the play voice message routine 764 of the flowchart.

Figure 22:
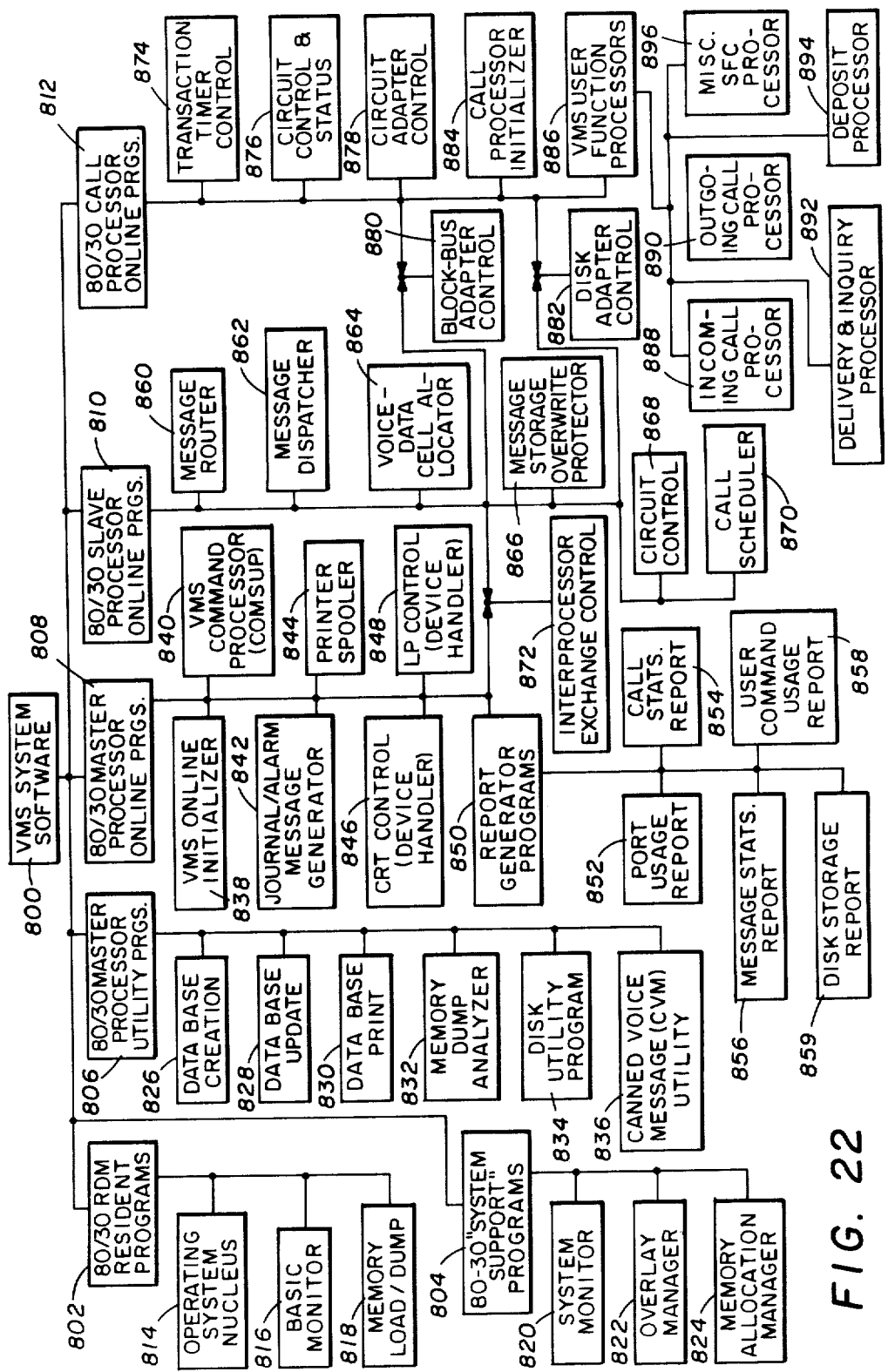
FIG. 22 is a visual table of contents of all of the programs included in the present software system.

FIG. 22 contains a VTOC (Visual Table of Contents) of all the programs included in the VMS system software 800. At the top level these programs are divided into six categories as follows:

(1) ROM-resident programs 802,
(2) "System support" programs 804,
(3) Master processor utility programs 806,
(4) Master processor "online" programs 808,
(5) Slave processor "online" programs 810,
(6) Call processor "online" programs 812.

All of these programs run in the 80/30 SBC's (Single Board Computers) that are used to implement the call processor in the call processor subsystem 62 or the master and slave processors in the administrative subsystem 60.

80/30 ROM-Resident Programs

The processor programs are contained in read-only memory (ROM), and are used in all three categories of processors ("master," "slave," and "call"). An operating system nucleus 814 is the resident operating system that controls the multi-tasking environment of the application programs. A Basic Monitor 816 is the program that receives control on power-up, or system reset. It provides some simple CRT-based functions, such as examining and modifying the contents of memory cells, and also controls memory loading/dumping. A Memory Load/Dump 818 operates under control of the Basic Monitor 816. It provides the functions of loading "memory-image" data into memory from disk, and dumping memory to disk. An area of the disk is reserved for these memory-images that are used by this program.

80/30 "System Support" Programs

The System Monitor 820 program is used only in the master processor. Its function is to load programs from disk into memory as instructed to do so by an operator at the console CRT 104. The Overlay Manager program 822 is a support function that is used to load individual program-segment overlays into memory. The Memory Allocation Manager program 824 is a support function that manages a "pool" of memory space from which blocks (of memory space) are dynamically allocated to requesting programs.

80/30 Master Processor Utility Programs

The Master Processor Utility Programs 806 are not normally used when the VMS system 10 is online. The functions they provide can be regarded as "tools" that are used to maintain, update, and debug the system. A Data Base Creation program 826 is used to create a completely new user record data base on the system disk. A Data Base Update program 828 and Data Base Print Program 830 will print the contents of the user records in the data base on the system line printer 108 (See FIG. 6) A Memory Dump Analyzer program 832 will display on the console CRT 104 or the line printer 108 the contents of a memory dump (or a portion thereof) as recorded in one of the disk storage areas reserved for memory dump/loads. A Disk Utility Program 834 provides a variety of functions that are concerned with moving, saving, and restoring information on the system disks 120; for example, transferring information from one area to another in disk storage, or transferring data from disk storage to/from diskettes. A Canned Voice Message (CVM) Utility program 836 prepares in a form suitable for storage on the system disks 120 the digitized voice data for the VMS canned voice messages.

80/30 Master Processor Online Programs

The Master Processor Online Program 808 runs in the master processor of the administrative subsystem 60 during online operation. Some of these programs are not limited to online use only (for example—the device handlers for the console CRT 104 and the line printer 108). A VMS Online Initializer program 838 performs a variety of initialization functions that are required to bring the system into an outline state. These functions include initializing (or restoring) global system tables in a memory, and giving instructions for the other processors (the master and the multiple call processors) to initialize themselves. A VMS Command Processor (COMSUP) program 840 provides all the functions required to support the VMS online command set. These commands are entered into the system via the console CRT 104. A Journal/Alarm Message Generator program 842 is to create and format, at the request of other programs in the system, journaling and alarm messages that are destined to be displayed on the system line printer 108. Journal messages, which are normally no more than one or two lines in length, are used to create a running log of "events" that occur during normal system operation. Alarm messages are used to log the occurrence of "abnormal" conditions that may require action by the system operator. A Printer Spooler program 844 "spools" the incoming requests for log messages to the system disk, and also to subsequently "de-spool" the messages and print them on the line printer 108. This mechanism allows printed messages to be temporarily buffered on disk while waiting for the line printer 108 to become available.

The CRT Control program 846 is a device handler that provides an interface between the CRT 104 keyboard/display and any program requesting I/O operations within the CRT 104. An LP Control program 848 is a device handler that provides an interface between the line printer 108 and any programs requesting output operations to the printer.

Report Generator Program 850 programs prepare, in a form suitable for the line printer, statistical reports on various aspects of system operations. The following types of reports are included:

(1) A Port Usage Report 852 provides usage statistics for the voice communication ports.
(2) A Call Report 854 provides statistics related to the incoming and outgoing calls that occurred during the report period.
(3) A Message Report 856 provides statistics related to new messages received and messages delivered during the report period.
(4) A User Command Usage Report 858 provides usage statistics for the use-frequency of the VMS 10 functions that may be invoked by users at their telephones.
(5) A Disk Storage Report 859 provides information on utilization of disk storage, and "soft errors" that may have occurred on individual disks.

80/30 Slave Processor Online Programs

The programs of the Slave Processor Online Programs 810 runs in the administrative subsystem 60 during online operation. The functions of most of these programs can be summarized by saying that they perform support operations that are requested by commands coming "upstream" from programs in the call processors 62A-62C.

A Message Router program 860 is informed of each occurrence of a new incoming message that has been received and stored in the system. It is responsible for creating the Message Control Block on disk, and insuring that the message is queued to each of its addresses. The program is also responsible for "expanding" distribution codes that are used as addresses.

A Message Dispatcher program 862 acts on requests coming up from the call processors 62A-62C to provide messages for delivery. For each request it will provide the address in disk storage 120 of the next message to be delivered to a user. There is an existing connection with this user for the purpose of delivering messages. After the message has been delivered it will be dequeued. A Voice-Data Cell Allocator program 864 allocates disk space for storing voice messages. Requests for space come "upstream" from programs in the call processors 62A-62C. The Allocator responds to these requests by returning (to the requesting programs) the addresses of the allocated disk storage.

A Message Storage Overwrite Protector program 866 protests "old" undelivered voice messages from being overwritten. As the Allocator program 864 continues to allocate disk storage space, the point will eventually be reached where some of this space must be re-used. It is the responsibility of the overwrite protector program 866 to insure that any undelivered messages in the space that is about to be re-used are protected or moved. A Circuit Control program 868 is responsible for overall control of the voice circuits. Information that comes upstream from the call processors 62A-62C that reflects changes in circuit status is handled by this program, as are status changes that result from commands by the system operator. A Call Scheduler program 870 is responsible for scheduling and initiating outgoing calls to users that have messages in queue awaiting delivery. Also included is the assignment of circuits for the outgoing calls.

An Inter-Processor Exchange Control program 872 is to pass information from programs running in the master processor 808 to those in the slave processor 810, and vice-versa. The external interface to this program looks like that for the block-bus control program. Internally, the main difference is that the data to be exchanged is passed through common memory that is addressable by both master and slave processors instead of being transmitted across the block-bus. There are two complementary sections of this program. One runs in the master, and one in the slave.

80/30 Call Processor Online Programs

The Call Processor Online programs 812 run in the call processor 62A-62C during online operation. Most of the functions provided by these programs are concerned with implementing the VMS user functions (those functions a user may invoke from his telephone).

A Transaction Timer Control program 874 is to manage the various "watchdog" timers that control the time limits applied to the various VMS 10 user functions. A Circuit Control and Status program 876 is responsible for overall control of the voice circuits attached to a single circuit subsystem. It reports changes in the status of circuits "upstream" to the slave processor, and responds to explicit requests for circuit state changes that come "downstream" from the slave processor. A Circuit Adapter control program 878 is a "device handler" that directly controls the hardware interface to a circuit module adapter. All I/O operations for the circuit modules and circuits are directed to this program.

A Block-Bus Adapter Control program 880 is a device handler program that directly controls the hardware interface to a block-bus adapter. The purpose of the block-bus, its hardware adapters (one in the administrative subsystem 60, and one in each circuit subsystem), and its handler program is to provide a path for communication between programs that are running in the different subsystems. A Disk Adapter Control program 882 directly controls the hardware interface to a disk adapter 114 or 116. All requests for data transfer to/from the data storage subsystem 64 are sent to this program. Notice in FIG. 1 that identical copies of this program run in the call processors and in the slave processor of the administrative subsystem. A Call Processor Initializer program 884 provides all of the functions required to bring a Call Processor into an online state after an initial program load.

A VMS User Function Processors program 886 provides all of the functions required to communicate with a VMS user at his telephone, and executes the VMS commands that are invoked by the user (by dialing digits). These function processors can be divided into five categories as follows:
 (1) An Incoming Call Processor 888—controls the "answering" of incoming calls to VMS from users.
 (2) An Outgoing Call Processor 890 controls the dialing and connection establishment for outgoing calls to users.
 (3) Delivery and Inquiry Processors 892 controls the process of delivering voice messages to a user; either for the "normal" delivery function (on an outgoing call), or the Inquiry function (on an incoming call).
 (4) A Deposit Processor 894 controls the process of receiving and storing new voice messsages from users.
 (5) Miscellaneous SFC Processors 896 are processors for Special Function Codes other than those that are included in the Delivery and Inquiry Processors.

VMS SYSTEM CONTROL AND DATA FLOW

FIGS. 23 and 24 show the control and data flow for the VMS 10 online system and software. Those programs shown in FIG. 22 that are used in an offline mode only do not appear in FIGS. 23 and 24. The solid line between programs denote paths of control flow. The dashed lines denote paths of data flow.

Call Processor Control and Data Flow

FIG. 23 shows the control and data flow for the programs than run in the call processor 62A-62C. All of the programs which must communicate with the voice circuit hardware do so via the Circuit Adapter Control Program 878. It is the "device handler" program for the circuit adapter hardware interface 900. Interface 902 represents the communication between this program and the circuit adapter hardware via the silo data structure 904 in shared memory. At least two silos are actually required; one for "downstream" commands from the program to the circuit controllers (via the circuit adapter), and one for status information coming "upstream" from the circuit controllers. Interface 906 represents hardware I/O commands issued by the control program directly to the circuit adapter interface. This is normally required only when the circuit adapter is being initialized after an initial program load (IPL), or after a change in the state of a silo (i.e., from an "empty" to a "not empty" state). Interface 908 represents the flow of data to/from the Circuit Adapter Tables 910 and the control program 878 and hardware interface 900. These tables are used for data that is related to commands going downstream or status coming upstream. There is a separate entry in these tables for each voice circuit attached to the circuit subsystem. In summary, commands from the program 878 to the interface 900 pass through the downstream silo of silo structure 904. Status information from the interface to the program passes through the upstream silo of silo structure 904. Additional information related to the commands and status is deposited in and extracted from the adapter tables 910 by both the program and the hardware interface.

Circuit Adapter/Disk Adapter Interface

Interface 912 and 914 represent the information flow between the Circuit Adapter hardware interface 900 and the Disk Adapter hardware interface 916. The Circuit Adapter control program 878 may issue read/write commands *directly* to the Disk Adapter 76 or 78 (FIG. 4) and no related processing is required by programs running in the 80/30 call processor 70 (FIG. 4). The Circuit Adapter program 878 accomplishes this by depositing requests for disk I/O operations directly in the Disk Adapter downstream silo of silo 917, thus bypassing the Disk Adapter Control Program 882. The disk I/O operations that may be requested by the Circuit Adapter are associated with writing/reading segments of voice messages to/from disk. The data comprising these message segments is temporarily stored in voice data buffers 136 or 138 (FIG. 8) (in shared memory). These buffers are allocated from and released to a buffer pool that is managed by both the Disk Adapter 114, 116 and the Circuit Adapter. The memory used for these buffers is located outside the 64K address space of the Call Processor 70, and is therefore *not* addressable by this processor.

Disk Adapter Control Program/Hardware Interface

All programs residing in the 80/30 Call Processor 90 that must perform disk I/O do so by issuing requests to the Disk Adapter Control Program 882 which, in turn, interfaces directly with the disk adapter hardware interface 916. This interface is implemented with at least one "downstream" silo and "upstream" silo (See interfaces 918 and 920). Requests for disk I/O operations are deposited by the control program into the downstream silo, and status information (usually indicating I/O request completions) is inserted into the upstream silo by the disk adapters 114, 116. Interface 920 denotes hardware I/O operations (including interrupts) that pass directly between the control program and the hardware interface. These are normally used only to initialize the disk adapters 114, 116 and to signal a change in state of a silo (for example, from "empty" to "not empty").

Block-Bus Adapter Control Program/Hardware Interface

The communication of information between programs running in the Call Processors 62A-62C (in Circuit Subsystems) and programs in the Administrative Subsystem 60 is accomplished by passing this information across the block-transfer-bus (or "Block-Bus"). Application programs interface with the block-bus adapter hardware interface 922 by issuing requests to the Block-Bus Adapter Control Program 880, which, in turn, interfaces with the adapter hardware with a silo control mechanism 924 (Interfaces 926 and 928.) This mechanism is almost exactly the same as that described above for the disk adapter, and it does not not need to be repeated.

Application Program Interfaces to Block-Bus Control Program

Interface 930 represents requests originating in the Disk Adapter Control Program 882 for alarm messages to be printed on the line printer 108, which will occur when disk errors are detected. Interface 932 represents all of the communication paths between the VMS User Function Processors 886 and the Slave Processor in the Administrative Subsystem 60. These include:

(1) downstream commands to originate outgoing calls,
(2) upstream notification of answered incoming calls,
(3) upstream notification when a new voice message has been received (this information is processed by the Router Program 860 in the Slave Processor, which creates the Message Control Block [MCB] for the new message, and inserts entries in the queues for the addresses of the message),
(4) downstream commands to deliver outgoing messages, and upstream notification of message delivery (this information is processed by the Message Dispatcher Program 862 in the Slave Processor, which issues commands for message delivery, and then de-queues messages after they are delivered),
(5) miscellaneous upstream requests to Slave Processor programs 810 that originate in the Special Function Code Processors 896.

Interface 934 consists of upstream requests from the Circuit Control and Status Program 876 that are reporting a status change in a circuit, and downstream commands from the Slave Processor 810 that force a change in the status of a circuit.

Interfaces With User Function Processors

Interface 936 represents any requests for disk I/O that originate in the VMS User Function Processors 886.

Interface 938 represents commands originating in the User Function Processors 886 that are destined for individual voice circuits, and upstream status information that originates in the voice circuit controllers. Associated with this status information is data deposited through interface 940 by the Circuit Adapter Control Program 878 in the Circuit Tables 942.

Interface 944 represents control functions performed by the Transaction Timer Control Program 874. It consists primarily of requests to "awaken" the continuation of processing for a particular circuit when a "watchdog timer" has expired.

Interface 948 represents control function flow between the User Function Processors 886 and the Circuit Control and Status Program 876 that occur as a result of circuit status changes.

Interface 952 represents data flow between the User Function Processors 886 and the Circuit Tables 942.

These tables contain entries (an "entry" is a single circuit table) for all of the voice circuits controlled by the Call Processors 62A-62C. Each circuit table, in turn, contains all of the information required for the Call Processors 62A-62C to control the circuit, and to execute the VMS functions during calls that use the circuit. Note that several programs other than the User Function Processors 886 must also access selected information in the Circuit Tables 942. These are the Circuit Adapter Control Program 878, the Transaction Timer Control Program 874 and the Circuit Control and Status Program 876.

Master and Slave Processors Control and Data Flow

FIG. 24 shows the control and data flow for those programs residing in the master and slave processors of the administrative subsystem 60. Although these two processors run asynchronously with respect to each other, a part of their addressable memory space 954 is shared. Tables which must be accessed by programs in both processors reside in this common memory space and include cell allocation tables 956, system tables 958, circuit tables 942, user tables 960 and call scheduling tables 962.

Two programs residing in the slave processor that control hardware interfaces, the Disk Adapter Control Program 882 and the Block-Bus Control Program 880, are essentially these same programs residing in the Call Processor of FIG. 23. These have already been discussed in the description of the control and data flow for the Call Processor, and will not be discussed again here.

Interprocessor Exchange Control Program

The Interprocessor Exchange Control program 872 provides a mechanism for the transfer of information between programs running in the slave processor and those running in the master processor. The external interface to this program is very similar to that for the Block Bus Control Program 880. The major internal difference is that, instead of transferring the messages between programs via the block-bus, the transfer is by way of common memory. The mechanism uses silos for inter-processor synchronization; however, there is no hardware interface like the block-bus interface involved in the process.

Voice-Data Cell Allocator and Message Overwrite Protector

The Voice-Data Call Allocator 864 services requests for allocation of voice-data storage cells that originate in the Call Processor 62A-62C. Using data in the Cell Allocation Tables 956, disk space is allocated, and the address of this space is returned to the requesting programs. When almost all of the voice-data cells on a particular disk have been allocated, the Message Overwrite Protector 866 is activated. This program checks for the presence of any cells still in use that reside in the storage areas that are about to be re-used or allocated again. Any such cells are "protected" by moving them. The requests for disk I/O are made by the Overwrite Protector 866 for the purpose of moving voice-data cells to the Disk Adaptor Program 882.

Message Router

When a new message has been received and stored on disk, the appropriate Call Processor sends a request upstream to the Message Router program 860. This program performs two major functions. First, it creates the Message Control Block (MCB) from information contained in the upstream request. The MCB contains most of the bookkeeping and control information required for subsequent processing of the message. The second function performed by the Router Message Program 860 is to deposit entries in the output queues for the addresses of the message.

Message Dispatcher

The Message Dispatcher 862 provides Call Processor information concerning the pending delivery of an outgoing message. When the delivery process on a call has progressed to the point where delivery of an outgoing message is to begin, the Message Dispatcher 862 is notified by the appropriate Call Processor 62A-62C through Block-Bus Control Program 880. The Message Dispatcher 862 selects a message from a queue and returns information concerning the identity and location of the message to the Call Processor 62A-62C. The Dispatcher 862 always selects a message that is at the top (beginning) of a particular queue to be delivered next. If there is more than one queue to be considered (some message recipients may have more than one FIFO queue), then the selection of the queue is made on a priority basis. The Call Processor 62A-62C will again notify the Dispatcher 862 after it has successfully delivered the selected message. The Dispatcher 862 will respond by de-queueing this message, and selecting another message for delivery. If there are no additional messages awaiting delivery, then the Dispatcher 862 informs the Call Processor 62A-62C that the queues for this addressee are empty.

Circuit Control

The Circuit Control and Status Program 878 communicate with one of the Call Processors 62A-62C via Block-bus 880. Communication across this interface occurs for the following types of events:
(1) Circuit Control is notified when an autonomous change in the status of a circuit occurs. The new state is duly recorded in the Circuit Tables 942, and if the new state is an "abnormal" one (such as circuit out of service), a request is sent to the Journal/Alarm Program 842 to generate an appropriate alarm message.
(2) Circuit Control is also notified when a circuit autonomously goes off-hook (an incoming call is answered), and when a disconnect occurs on an existing call.
(3) Circuit Control interfaces with the VMS Command Processor Program 846 (in the master processor) for operator commands which dictate changes in the state of a voice circuit.

In these cases Circuit Control will update the appropriate items in the System Tables 958 and Circuit Tables 942, and, if necessary, the appropriate commands downstream to the affected Call Processor 62A-62C.

Call Scheduler

The Call Scheduler 870 is responsible for the scheduling of outgoing calls to message addresses. It uses information recorded in the User Tables 960 and Call Scheduling Tables 962 to decide when to initiate a call. The actual request to initiate a call is sent to the Circuit Control and Status Program 876.

Journal/Alarm Generator

The Journal/Alarm Generator 842 receives requests for specific journal or alarm messages that are to be "logged" on the system line printer 108. It formats the messages, and then passes them to the Printer Spool Program 844 in the master processor.

Line Printer Control and Printer Spool Programs

When the VMS system 10 is operating online, all requests for the printing of information on the line printer 108 are sent to the Printer Spool Program. These requests originate in the Journal/Alarm Generator 842 and the Report Generator Programs 850. The Spool Program 844 "buffers" these requests by writing them on the disks. It then schedules the print requests in an orderly manner to the Line Printer Control Program 848. This program, in turn, directly controls the line printer hardware interface 964.

Report Generator Programs

The requests for the different types of reports originate directly, or indirectly, in the VMS Command Processor Program 840. The direct requests are caused by VMS commands that explicitly request the generation of a specific report. The indirect requests are caused by VMS commands that set the time-of-day and time intervals for generation of specific reports. These reports are then created on a time-periodic basis. Most of the information required for creating a report is contained in the System Tables 958 and Circuit Tables 942.

VMS Command Processor

This program receives system operator commands from the CRT Control Program 846, performs the function requested by the command, and returns a response to the operator. Some of these command functions have already been discussed, such as report generation requests and circuit control requests. Other commands are requests for various types of status information. The Command Processor 840 extracts this information from the System Tables 958 and Circuit Tables 942 and the User Tables 960.

Console CRT Control Program

This is a "device handler" program which directly controls the CRT hardware interface 966. It accepts read and write requests for the CRT 104.

VMS Online Initializer

The VMS Online Initializer program 838 performs a variety of functions that are required to bring the system into an online state. To do this it must access information from the following tables shown in shared memory 954:

(1) the Cell Allocation Table 956,
(2) the System Tables 958 and Circuit Tables 942,
(3) the User Tables 960, and
(4) the Call Scheduling Tables 962.

At least a portion of the information in each of the above tables, the portion accessed by the Initializer, is maintained in non-volatile memory so that it is not destroyed when system power is removed.

We claim:

1. An electronic communication message system for being coupled to any private branch exchange or central office for receiving, storing and forwarding audio messages from users' telephone facilities, comprising:

electronic digital signal processing means for controlling the operation of the message system;

digital memory means controlled by said electronic digital signal processing means for storing digital representations of the audio messages;

means for enabling an originator to access the message system through signals transmitted from a telephone station;

means for controlling unauthorized user access to the message system;

means for storing in said memory means digital representations of audio messages from the telephone station of the originator;

said electronic digital signal processing means including means for timing a predetermined period of time so that the originator may generate an audio message and store digital representations of said audio message in said memory means;

means for storing selected recipient telephone station addresses for digital representations of audio messages stored in said memory means;

means for accessing said stored digital representations associated with particular telephone station addresses;

means for reproducing the audio messages from the stored digital representations; and means for sequentially transmitting the reproduced audio messages to said selected recipient telephone stations.

2. The communication message system for receiving, storing and forwarding audio messages of claim 1, wherein said electronic digital signal processing means processes signals from a telephone station and further comprising:

means for storing digital representations of instructional audio messages in said memory means; and means for converting one of said stored digital representations to an instructional audio message and transmitting said instructional audio message to a user's telephone station in response to a signal from said electronic digital signal processing means.

3. The communication message system for receiving, storing and forwarding audio messages of claim 1, and further comprising verifying means for preventing access to the message system unless a proper originator's identification code is entered by the user.

4. The communication message system for receiving, storing and forwarding audio messages of claim 1, wherein said electronic digital signal processing means includes means for generating an audible alarm signal to an originator's telephone station a predetermined period of time before said originator's time for storing an audio message expires.

5. The communication message system for receiving, storing and forwarding audio messages of claim 1, wherein said means for accessing said selected telephone stations includes means for accessing a selected telephone station address a predetermined number of times until the audio message is transmitted to the selected telephone station.

6. The communication message system for receiving, storing and forwarding audio messages of claim 5, and further comprising means for determining that the audio message has not been transmitted to the recipient in a predetermined period of time.

7. The communication message system for receiving, storing and forwarding audio messages of claim 6, wherein said means for determining that the audio message has not been transmitted includes means for accessing the telephone station of the originator of the audio message for providing a signal that the audio message has not been transmitted to the intended recipient.

8. The communication message system for receiving, storing and forwarding audio messages of claim 5, and further including means allowing a user to predetermine the number of attempts and time intervals between the attempts said accessing means attempts to access said selected recipient telephone stations.

9. The communication message system for receiving, storing and forwarding audio messages of claim 1, wherein the originator may control the storing of digital representations of an audio message in said memory means through signals transmitted from the originator's telephone station of the user's telephone facility.

10. The communication message system for receiving, storing and forwarding audio messages of claim 1, comprising means for selecting a time period in which said reproduced audio message is to be transmitted to a recipient telephone station.

11. A communication message system for receiving, storing and fowarding audio messages of claim 1, and further comprising means for a recipient to enter an identification code through signals transmitted from the recipient telephone station for allowing said transmitting means to transmit stored audio messages to the recipient.

12. The communication message system for receiving, storing and forwarding audio messages of claim 1 and further comprising:
   means for enabling a recipient to access the message system through signals transmitted from the recipient's telephone station at the end of the originator's transmitted audio message;
   means for the recipient to store in said memory means digital representations of an audio message; and
   means for the recipient to store a selected telephone station address in said memory means such that the addressee may receive both the recipient's audio message and the originator's audio message.

13. The communication message system for receiving, storing and forwarding audio messages of claim 1, and further comprising means for transferring a digital representation of a transmitted audio message to said memory means for storage for a predetermined period of time.

14. The communication message system for receiving, storing and forwarding audio messages of claim 1 and further comprising:
   means for storing predetermined usage parameters for audio messages stored and forwarded in the communication message system; and
   a printer controlled by said electronic digital signal processing means for outputting a summary report of the said stored predetermined usage parameters of the message system.

15. An electronic communication message system for being coupled to any private branch exchange or central office for receiving, storing and forwarding audio messages from user's telephone facilities, comprising:
   electronic digital signal processing means for controlling the operation of the message system;
   digital memory means controlled by said electronic digital signal processing means for storing digital representations of the audio messages;
   means for enabling an originator to access the message system through signals transmitted from a telephone station;
   means for controlling unauthorized user access to the message system;
   means for storing in said memory means digital representations of audio messages from the telephone station of the originator;
   means for storing selected recipient telephone station addresses for digital representations of audio messages stored in said memory means;
   means for accessing said stored digital representations associated with particular telephone station addresses;
   means for reproducing the audio messages from the stored digital representations;
   means for sequentially transmitting the reproduced audio messages to said selected recipient telephone stations; and
   said means for storing selected telephone station addresses including means for designating with an abbreviated address a plurality of telephone station addresses for receipt of one of said reproduced audio messages, wherein each of said telephone stations receives the same audio message.

16. The communication message system for receiving, storing and forwarding audio messages of claim 15, and further including means for deleting one of said designated addresses in the stored predetermined selected telephone station addresses in response to signals from a user's telephone station.

17. An electronic communication message system for being coupled to any private branch exchange or central office for receiving, storing and forwarding audio messages from users' telephone facilities, comprising:
   electronic digital signal processing means for controlling the operation of the message system;
   digital memory means controlled by said electronic digital signal processing means for storing digital representations of the audio messages;
   means for enabling an originator to access the message system through signals transmitted from a telephone station;
   means for controlling unauthorized user access to the message system;
   means for storing in said memory means digital representations of audio messages from the telephone station of the originator;
   means for storing selected recipient telephone station addresses for digital representations of audio messages stored in said memory means;
   means for accessing said stored digital representations associated with particular telephone station addresses;
   means for reproducing the audio messages from the stored digital representations;
   means for sequentially transmitting the reproduced audio messages to said selected recipient telephone stations;
   means for a recipient to reply to the originator of an audio message after receiving the audio message on the same telephone call through signals transmitted from the recipient's telephone station;
   means for storing digital representations of a reply message in said memory means; and
   means for reproducing and transmitting the reply message to the originator's telephone station.

18. An electronic communication message system for receiving, storing and forwarding audio messages from users' telephone facilities, comprising:

electronic digital signal processing means for controlling the operation of the message system;

digital memory means controlled by said electronic digital signal processing means for storing digital representations of the audio messages;

means for enabling an originator to access the message system through signals transmitted from a telephone station;

means for controlling unauthorized user access to the message system;

means for storing in said memory means digital representations of audio messages from the telephone station of the originator;

means for storing selected recipient telephone station addresses for digital representations of audio messages stored in said memory means;

means for accessing said stored digital representations associated with particular telephone station addresses;

means for reproducing the audio messages from the stored digital representations;

means for sequentially transmitting the reproduced audio messages to said selected recipient telephone stations; and means for automatically notifying the originator if the reproduced audio message is not delivered to the intended recipient within a predetermined period of time.

19. An electronic communication message system for receiving, storing and forwarding audio messages from users' telephone facilities, comprising:

electronic digital signal processing means for controlling the operation of the message system;

digital memory means controlled by said electronic digital signal processing means for storing digital representations of the audio messages;

means for enabling an originator to access the message system through signals transmitted from a telephone station;

means for controlling unauthorized user access to the message system;

means for storing in said memory means digital representations of audio messages from the telephone station of the originator;

means for storing selected recipient telephone station addresses for digital representations of audio messages stored in said memory means;

means for accessing said stored digital representations associated with particular telephone station addresses;

means for reproducing the audio messages from the stored digital representations;

means for sequentially transmitting the reproduced audio messages to said selected recipient telephone stations; and means for providing audible progress tones to a user in response to the electronic digital signal processing means operating upon signals from a telephone station.

20. The communication message system for receiving, storing and forwarding audio messages of claim 19, and further comprising means for a user to select stored instructional audio messages to be reproduced in place of said progress tones.

21. An electronic communication message system for being coupled to any private branch exchange or central office for receiving, storing and forwarding audio messages from users' telephone facilities, comprising:

electronic digital signal processing means for controlling the operation of the message system;

digital memory means controlled by said electronic digital signal processing means for storing digital representations of the audio messages;

means for enabling an originator to access the message system through signals transmitted from a telephone station;

means for controlling unauthorized user access to the message system;

means for storing in said memory means digital representations of audio messages from the telephone station of the originator;

means for storing selected recipient telephone station addresses for digital representations of audio messages stored in said memory means;

means for accessing said stored digital representations associated with particular telephone station addresses;

means for reproducing the audio messages from the stored digital representations;

means for sequentially transmitting the reproduced audio messages to said selected recipient telephone stations; and means for a recipient to control said transmitting means through signals transmitted from a recipient telephone station to said electronic digital signal processing means.

22. An electronic communication message system for being coupled to any private branch exchange or central office for receiving, storing and forwarding audio messages from users' telephone facilities, comprising:

electronic digital signal processing means for controlling the operation of the message system;

digital memory means controlled by said electronic digital signal processing means for storing digital representations of the audio messages;

means for enabling an originator to access the message system through signals transmitted from a telephone station;

means for controlling unauthorized user access to the message system;

means for storing in said memory means digital representations of audio messages from the telephone station of the originator;

means for storing selected recipient telephone station addresses for digital representations of audio messages stored in said memory means;

means for accessing said stored digital representations associated with particular telephone station addresses;

means for reproducing the audio messages from the stored digital representations;

means for sequentially transmitting the reproduced audio messages to said selected recipient telephone stations; and means to transfer digital representations of an audio message transmitted to a recipient to said memory means, including means for assigning a file identification number for storing with said digital representations of said message in said memory means for later replay.

23. An electronic communication message system for storing and forwarding audio messages from a user's telephone facility, comprising:

electronic digital signal processing means for controlling the operation of the message system;

digital memory means controlled by said electronic digital signal processing means for storing digital representations of the audio messages;

means for enabling an originator to access the message system through signals transmitted from a telephone station;

means for controlling unauthorized user access to the message system;

means for storing in said memory means digital representations of an audio message from the telephone station of the originator;

means for storing selected recipient telephone station addresses for digital representations of audio messages stored in said memory means;

means for reproducing the audio messages from the stored digital representations;

means for transmitting the reproduced audio messages to said selected recipient telephone stations;

means for a recipient to access the message system through signals transmitted from a telephone station;

means for determining the total number of audio messages corresponding to the digital representations addressed to the recipient;

means for transmitting an audio message from the message system to inform the recipient of the number of audio messages for delivery; and means for the recipient to activate the transmission of an audio message corresponding to the digital representations addressed to the recipient.

24. An electronic communication message system for connection to a private branch exchange telephone facility for use in facilitating communications between users of the private branch exchange, comprising:

an electronic digital signal processing means for controlling the operation of a message system;

means for enabling an audio message originator to access the message system through a signal transmitted to said electronic digital signal processing means from a telephone unit of the private branch exchange;

digital memory means for storing digital representations of an audio message originating from a telephone unit of the private branch exchange;

means for selecting at least one addressee to receive the audio message;

means for accessing said message addressee's telephone unit connected to the private branch exchange in response to the selected message addressee;

means for reproducing the audio message from the stored digital representations;

means for transmitting the reproduced audio message to the addressed telephone unit;

means for accumulating the total number of stored digital representations of audio messages for an addressee;

means for reproducing an audible signal corresponding to said accumulated total of stored digital representations of audio messages; and means for transmitting said audible signal in response to a signal from a message addressee to enable a user to determine the number of audio messages for the user.

25. The communication message system of claim 24, wherein said means for accessing is automatically controlled by said electronic digital signal processing means to attempt to access said addressee's telephone station at predetermined time intervals until the audio message is transmitted to the addressee.

26. The communication message system of claim 25, and further comprising means for automatically notifying the message originator if an audio message is not delivered to the intended addressee within a predetermined period of time.

27. The electronic communication message system of claim 24, and further comprising means for said message originator to access the message system for deleting a stored digital representation of an audio message prior to delivery of that audio message to the addressee.

28. The electronic communication message system of claim 24, and further comprising means for the audio message originator to electronically edit the digital representation of the audio message transmitted to the memory means of the message system through signals transmitted from the message originator's telephone unit.

29. The electronic communication message system of claim 24, and further comprising means for the message addressee to save the transmitted audio message by entering a special function code through the message addressee's telephone unit.

30. The electronic communication message system of claim 24, and further comprising means for the message addressee to record a reply message on the same telephone call by accessing the message system with entry of a special function code and by transmitting a message for storage in said system.

31. The electronic communication message system of claim 24, and further comprising means for the message addressee to redirect the transmitted audio message to another addressee by accessing the message system with the entry of a special function code.

32. The electronic communication message system of claim 31, and further comprising means for the message addressee to store an audio reply message for subsequent transmission with the redirected original transmitted audio message.

33. The electronic communication message system of claim 24, and further comprising means for a message addressee to enter digital representations of a transmitted audio message in memory means together with means for identifying said message for enabling later retrieval of said digital representations of said audio message from said memory means.

34. A method for storing audio messages transmitted from a user's telephone station and for subsequently forwarding the stored audio messages to a selected message addressee, comprising:

providing an access signal in order to allow a message originator to transmit an audio message through the telephone station;

recording and storing the originator's audio message along with addressee identification information;

providing access to a selected message addressee in response to the stored message addressee information;

reproducing and transmitting the stored audio message in response to accessing the selected message addressee;

accumulating the total number of stored audio messages intended for an addressee; and reproducing and transmitting the number of stored audio messages for an addressee in response to a signal from the message addressee.

35. The method of storing and forwarding audio messages of claim 34 and further comprising:
storing instructional audio messages to provide a user with information on storing, forwarding and receiving audio messages; and
reproducing one of said stored instructional messages responsive to a user's progress in storing and receiving audio messages.

36. The method of storing and forwarding audio messages of claim 35, and further comprising:
storing and indexing an audio message transmitted to a message addressee to form a file of stored audio messages.

37. The method of storing and forwarding an audio message of claim 34, and further comprising:
automatically accessing the telephone of an intended message addressee a predetermined number of times at predetermined time intervals until the stored audio message is transmitted to the message addressee.

38. The method of storing and forwarding an audio message of claim 34, and further comprising:
automatically signaling the audio message originator if the stored audio message is not delivered to the intended message addressee in a predetermined period of time.

39. The method of storing and forwarding an audio message of claim 34, and further comprising:
storing a user's identification code for each telephone station of a telephone facility; and
allowing access for deposit of an audio message only upon entry of a valid user's identification code corresponding to said stored identification code.

40. The method of storing and forwarding an audio message of claim 34, and further comprising:
controlling the storing of an audio message through control signals entered by a user at the message originator's telephone station to enable the user to stop or start the transmittal of the audio message and to reverse or advance playback of the stored audio message for a selected limited time interval.

41. An electronic communication network enabling communication between remote locations of a user's network telephone facility for storing and forwarding audio messages, comprising:
first and second remotely disposed electronic communication systems coupled to remote portions of the telephone facilities of a user's network telephone facility, each of said first and second electronic communication systems further comprising:
means responsive to signals transmitted from the user's telephone facility for enabling access to each of said systems;
means for storing digital representations of audio messages transmitted from the user's telephone facility;
means for storing digital representations of route data transmitted from the user's telephone facility and indicating the intended addresses of the audio messages;
means for accessing stored digital representations of audio messages for a selected message addressee in response to said route data;
means for reproducing the audio messages from the stored digital representations;
means for transmitting the reproduced audio messages to the telephone station of the message addressee;
first and second signal transmitting and receiving means connected to said first and second electronic communication systems for enabling access between said electronic communication systems; and
a data transmission link between said first and second transmitting and receiving means for enabling the exchange of information between said first and second electronic communication systems.

42. An electronic communication message system for storing and forwarding audio messages via telephones comprising:
a plurality of ports for being coupled to any private branch exchange or central office to receive audio messages and address signals which represent plural desired recipients from various telephone stations;
means associated with said ports for converting said audio messages and address signals into digital signals;
digital storage means for storing said digital signals representing audio messages and said address signals from each of said ports;
means for accessing all digital signals representing audio messages stored in said storage means and associated with each address signal;
electronic digital signal processing means for controlling the operation of said storage means and said accessing means;
means for converting said access digital signals into audio messages; and
means for sequentially transmitting all audio messages associated with an address signal through said ports to each of said plural desired recipients.

43. The electronic communication system of claim 42, and further comprising means for coupling said storage means and said signal processing means which includes two data storage buses to provide redundancy in the communications system for the input and output of audio data from the storage means and to double the available band width for the storage and retrieval of audio data.

44. An electronic communications message system for storing and forwarding audio messages via telephones comprising:
a plurality of ports for being coupled to any private branch exchange or central office to receive audio messages and address signals of desired recipients from various telephone stations;
means associated with said ports for coverting said audio messages and address signals into digital signals;
digital storage means for storing said digital signals representing audio messages and said address signals from each of said ports;
means for accessing all digital signals representing audio messages stored in said storage means and associated with each address signal;
electronic digital signal processing means for controlling the operation of said storage means and said accessing means;
means for converting said access digital signals into audio messages;
means for sequentially transmitting all audio messages associated with an address signal through one of said ports to the desired recipient; and
means for transmitting an audio signal to said desired recipient informing of the number of audio messages to be transmitted.

45. An electronic communication message system for storing and forwarding audio messages via telephones comprising:
- a plurality of ports for being coupled to any private branch exchange or central office to receive audio messages and address signals of desired recipients from various telephone stations;
- means associated with said ports for converting said audio messages and address signals into digital signals;
- digital storage means for storing said digital signals representing audio messages and said address signals from each of said ports;
- means for accessing all digital signals representing audio messages stored in said storage means and associated with each address signal;
- electronic digital signal processing means for controlling the operation of said storage means and said accessing means;
- means for converting said access digital signals into audio messages;
- means for sequentially transmitting all audio messages associated with an address signal through one of said ports to the desired recipient; and
- means for enabling said desired recipient to transmit reply audio messages to said message system for storage and forwarding after said desired recipient has received audio messages.

46. An electronic communication message system for storing and forwarding audio messages via telephones comprising:
- a plurality of ports for being coupled to any private branch exchange or central office to receive audio messages and address signals of desired recipients from various telephone stations;
- means associated with said ports for converting said audio messages and address signals into digital signals;
- digital storage means for storing said digital signals representing audio messages and said address signals from each of said ports;
- means for accessing all digital signals representing audio messages stored in said storage means and associated with each address signal;
- electronic digital signal processing means for controlling the operation of said storage means and said accessing means;
- means for converting said access digital signals into audio messages;
- means for sequentially transmitting all audio messages associated with an address signal through one of said ports to the desired recipient; and
- means responsive to function signals generated by the desired recipient for performing an operation upon said audio messages.

47. The electronic communication message system for storing and forwarding audio messages via telephones of claim 46 and further comprising:
- means for erasing the digital representations of one of said audio messages from said storage means.

48. The electronic communication message system for storing and forwarding audio messages via telephones of claim 46 and further comprising:
- means for maintaining in said storage means the digital representations of at least one of said audio messages for subsequent accessing.

49. An electronic communication message system for storing and forwarding audio messages via telephones comprising:
- a plurality of ports for being coupled to any private branch exchange or central office to receive audio messages and address signals of desired recipients from various telephone stations;
- means associated with said ports for converting said audio messages and address signals into digital signals;
- digital storage means for storing said digital signals representing audio messages and said address signals from each of said ports;
- means for accessing all digital signals representing audio messages stored in said storage means and associated with each address signal;
- electronic digital signal processing means for controlling the operation of said storage means and said accessing means;
- means for converting said access digital signals into audio messages;
- means for sequentially transmitting all audio messages associated with an address signal through one of said ports to the desired recipient; and
- means for notifying the originator of an audio message if the desired recipient does not receive said audio message within a predetermined time interval.

50. An electronic communication message system for storing and forwarding audio messages via telephones comprising:
- a plurality of ports for being coupled to any private branch exchange or central office to receive audio messages and address signals of desired recipients from various telephone stations;
- means associated with said ports for converting said audio messages and address signals into digital signals;
- digital storage means for storing said digital signals representing audio messages and said address signals from each of said ports;
- means for accessing all digital signals representing audio messages stored in said storage means and associated with each address signal;
- electronic digital signal processing means for controlling the operation of said storage means and said accessing means;
- means for converting said access digital signals into audio messages;
- means for sequentially transmitting all audio messages associated with an address signal through one of said ports to the desired recipient; and
- means operable in response to function signals generated by the desired recipient to redirect a previously stored audio message to a new address location.

51. A method of storing and forwarding audio messages via telephones having tone signaling push button dialing comprising:
- coupling a plurality of ports through the telephone network to any private branch exchange or central office to receive audio messages and address signals of desired recipients from any one of a plurality of telephone stations;
- converting said audio messages and address signals into digital signals;

storing said digital signals representing audio messages and said address signals from each of the ports;

accessing all digital signals representing audio messages stored in said storage means and associated with each address signal;

converting said accessed digital signals into audio messages;

sequentially transmitting via a telephone call all audio messages associated with an address signal through one of the ports to the desired recipient in response to operation of the telephone push buttom dialing by the recipient; and receiving and transmitting audio messages left by said recipient during said telephone call.

* * * * *